Nov. 7, 1939.　　　E. RAMBUSCH ET AL　　　2,179,161
ILLUMINATING DEVICE
Filed Aug. 18, 1938　　　8 Sheets-Sheet 8
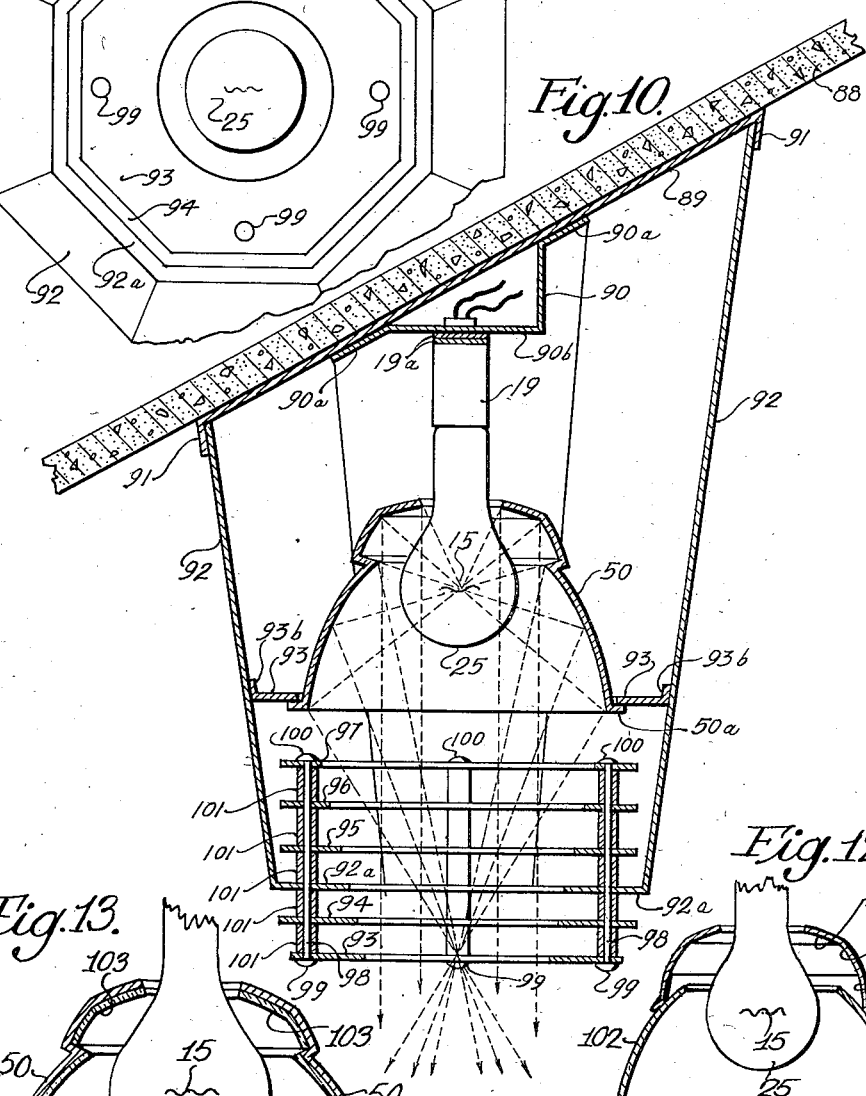
INVENTORS
EDWARD RAMBUSCH &
VICTOR G. ANDERSON
BY
THEIR ATTORNEY.

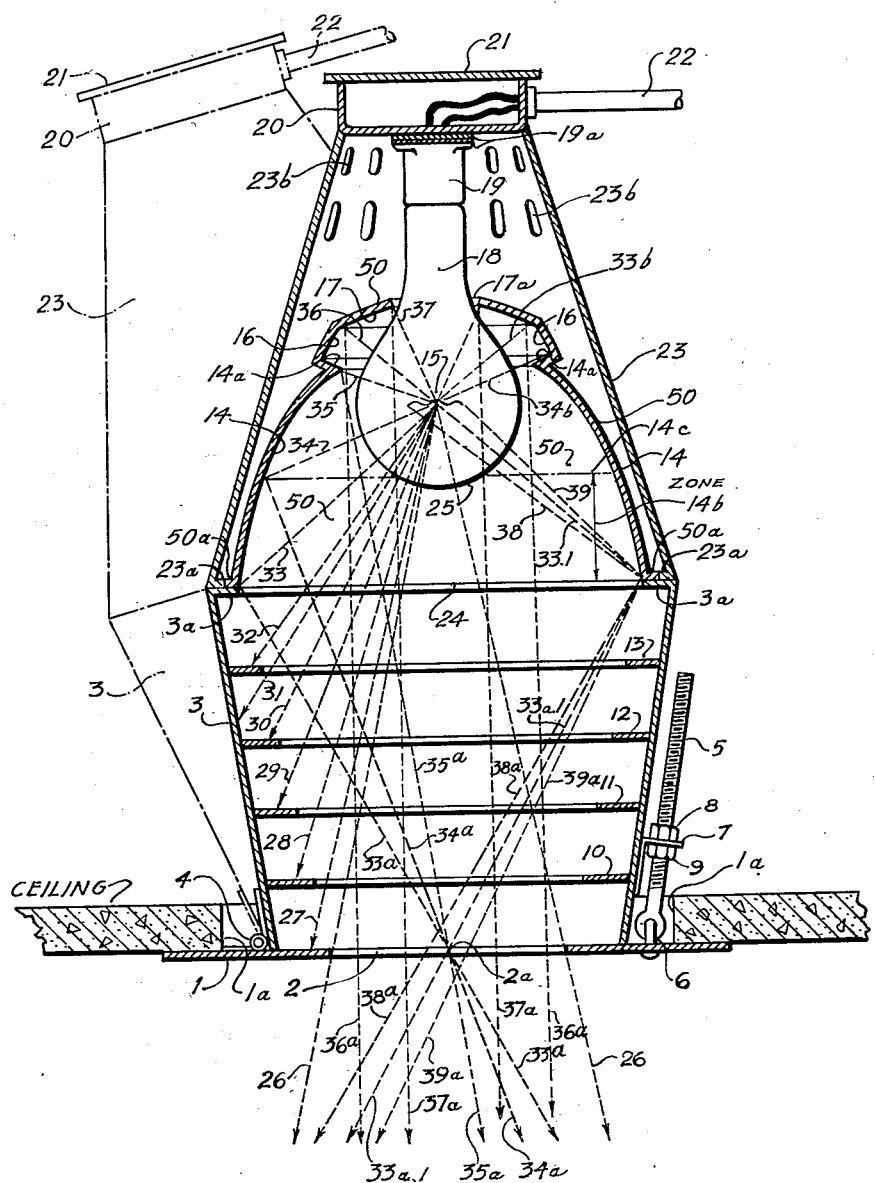

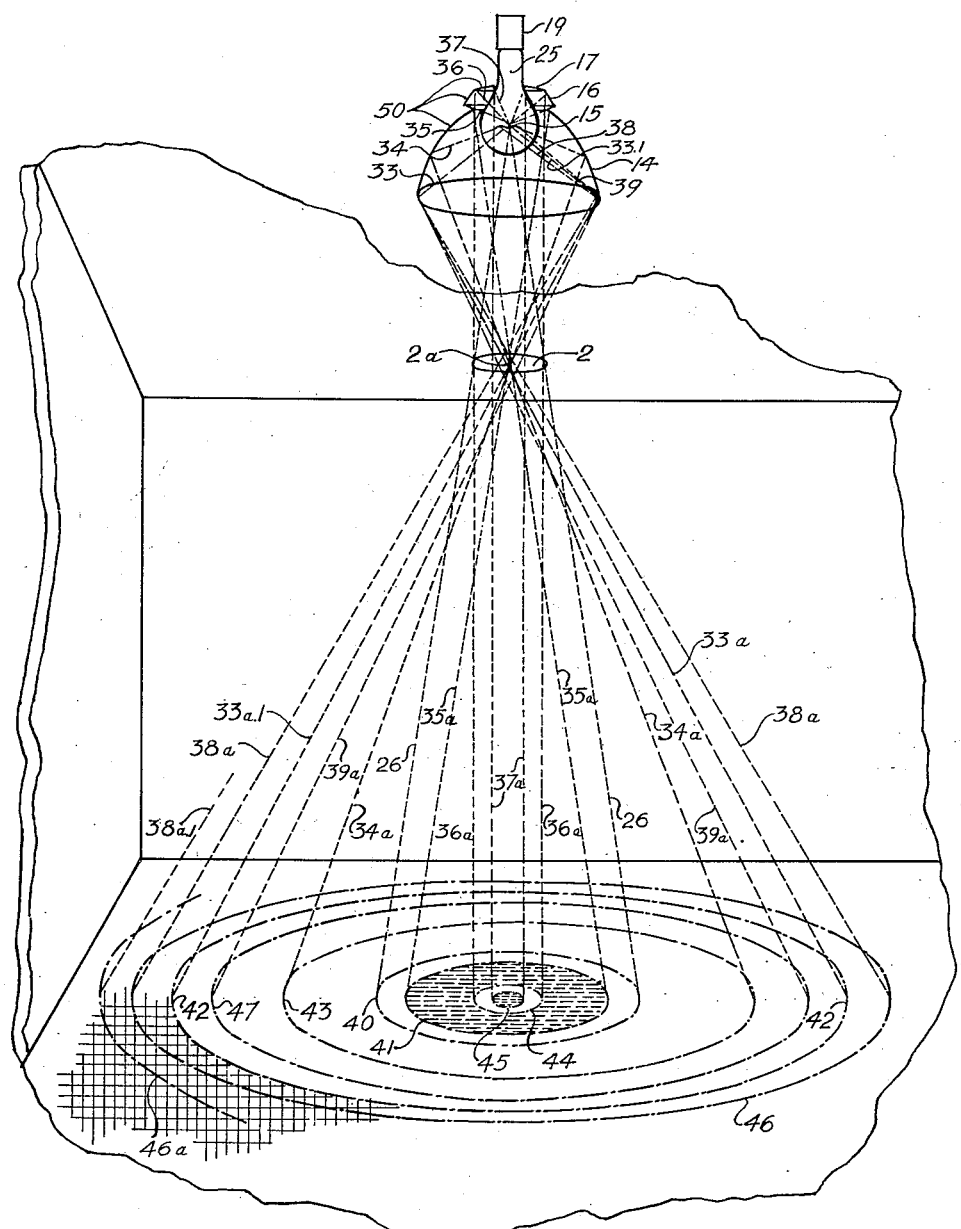

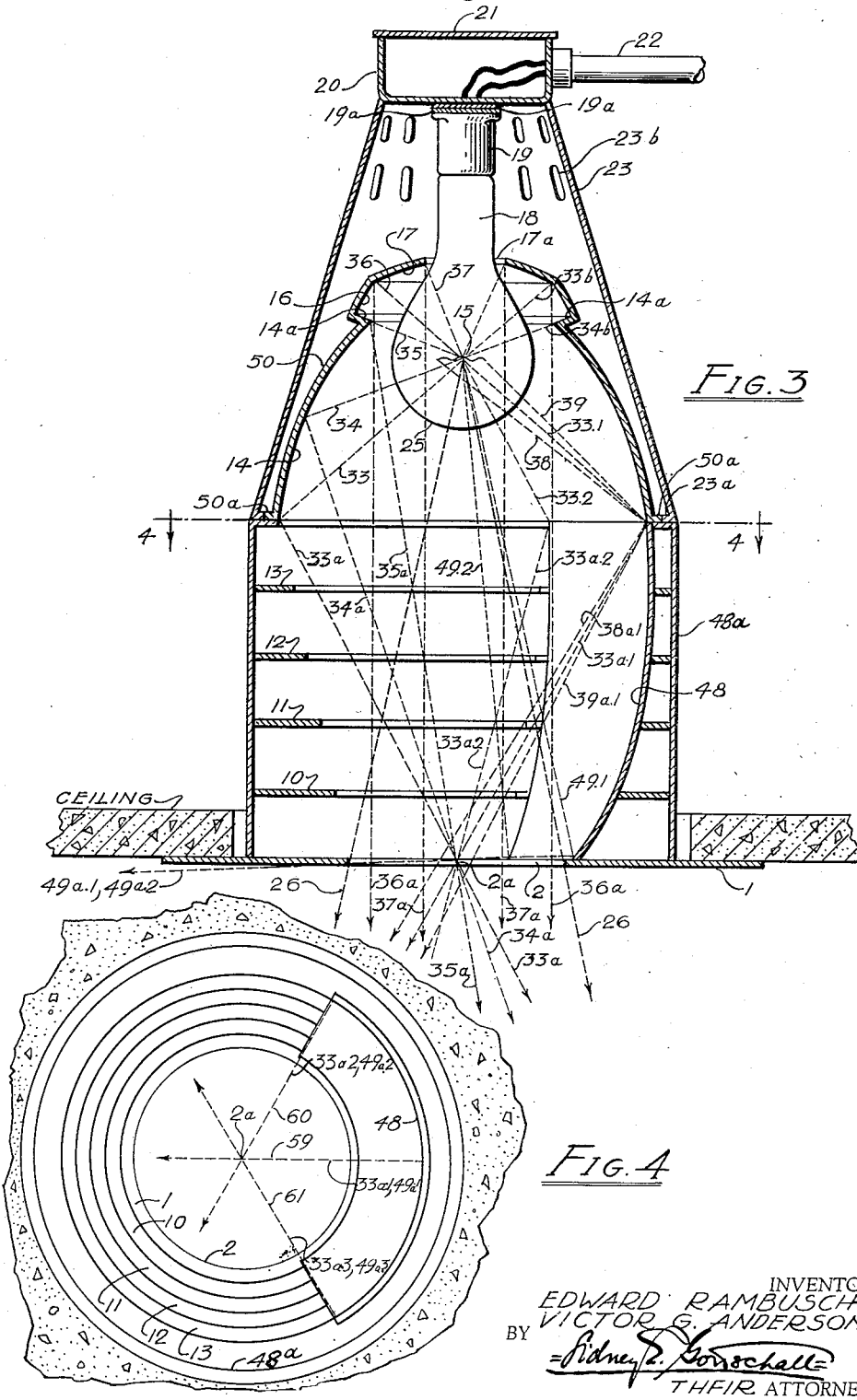

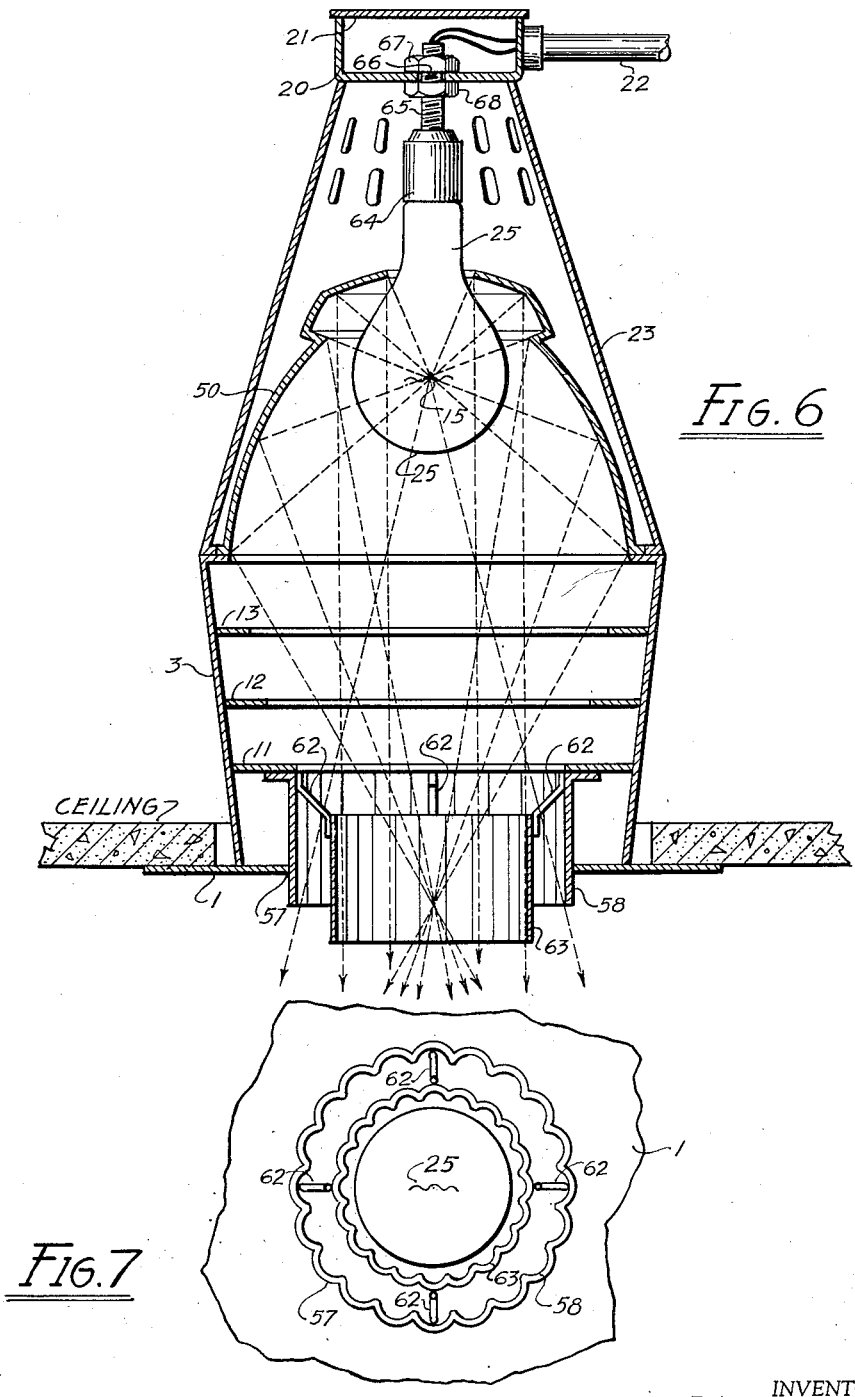

Patented Nov. 7, 1939

2,179,161

UNITED STATES PATENT OFFICE 2,179,161

ILLUMINATING DEVICE

Edward Rambusch, Brooklyn, and Victor G. Anderson, New Rochelle, N. Y., assignors to Rambusch Decorating Company, New York, N. Y., a corporation of New York Application August 18, 1938, Serial No. 225,548
In Great Britain March 24, 1938

23 Claims. (Cl. 240—78)

A part of this application, to wit: the hereinafter contained disclosure of, and claims to, the subject matter illustrated in Fig. 1 hereof, is covered, in a manner and fashion consistent with British patent practice, in a certain patent application, entitled: "Improvements in or relating to illuminating devices, No. 9048/38, filed on or about the 24th day of March, 1938, in Great Britain by a certain British subject, to wit: one, Niels Edward Rambush, as legal representative based upon a communication from one of us, to wit: Edward Rambusch, to which application an amendment was allowed on or about the 15th day of September, 1938 to include also the other of us, to wit: Victor G. Anderson, as a communicator of the invention to the said Niels Edward Rambush, the formal applicant for said Letters Patent in Great Britain, and accordingly, and to the greatest extent to which we may properly be entitled to same, we claim for the instant application under the law in such cases made and provided, the benefit of such British filing date.

This invention relates broadly to illuminating devices.

One of the objects of this invention is the creation of illuminating devices adapted, when in use, to provide as nearly as possible in practice, light of substantially uniform intensity over a limited area at a predetermined locality on a given surface.

Another object of this invention is the creation of illuminating devices adapted, when in use, to attain the foregoing object and, which on employing a light source of finite size, also will provide a band of light surrounding the aforesaid area, the intensity of the light in said band gradually decreasing from the intensity of light which prevails in the aforesaid area to zero as progressive radial departure is made within said band away from the outer boundary of the aforesaid area to the outer boundary of the band, said respective outer boundaries being separated by a predetermined finite distance.

Another object of this invention is the creation of illuminating devices adapted to attain the first two objects hereinbefore recited and, which because of additional structure of appropriate shape and outline, incorporated therein will direct light upon a certain additional surface or surfaces of predetermined outline; and, which additional structure may be so positioned therein as to cast additional light upon at least a portion of the illuminated surfaces mentioned in the second object hereinbefore recited, or not, as desired.

Another object of this invention is the creation of illuminating devices for attaining the desired lighting conditions hereinbefore mentioned, which devices are intended to be so disposed with respect to the ceiling of the room to be lighted that a prechosen portion of such devices will be disposed above and substantially all of such portion will be concealed by the ceiling and the remainder portion thereof will be visible from below the ceiling.

Another object of this invention is the creation of an illuminating device construction wherein, without material detraction from the lighting efficiency and economy in the making and use thereof, glare is wholly eliminated except when one looks into such device from a point within an area illuminated thereby along the direction of an emanated light ray originating from the light source therewithin.

Another object of this invention is the creation of illuminating devices adapted to attain any or all of the foregoing objects and which because of the addition to the structure thereof of appropriate light diffusing means will emit diffused light in all directions to generally work a soft lighting effect.

Another object of this invention is the creation of an illuminating device adapted to attain the lighting conditions herein mentioned in connection with the use of which appropriate means are provided for absorbing and disposing of such radiant heat energy as is emitted from the source of illumination to the maximum extent possible without appreciably impairing the lighting efficiency of the illuminating device.

A still further object of this invention is the creation of illuminating device constructions which are strong, durable, economical and easy to make and use in quantity, and are of such character that they may be readily cleaned and the lamp therein contained may be readily replaced, and which generally embody the mechanical advantageous features hereinafter more fully disclosed.

These and many other objects are secured by the constructions herein disclosed. Various other objects and advantages of the invention than those hereinabove specifically mentioned will appear more fully hereinafter. It is to be understood that the specific forms shown are merely illustrative and hence the detailed description thereof is not to be taken as limiting the invention itself.

This invention resides substantially in the parts as well as in the combination, construction, arrangement, and relative location of parts, all as will appear more fully hereinafter.

Referring to the drawings, in which the same reference numerals are used throughout the several views to indicate the same or similar parts, it will be found that:

Fig. 1 represents a side elevation in section of one of our illuminating devices mounted at and extending above a ceiling, with certain of the parts of the view being shown partly broken away, in full side elevation, or both, and with certain typical light rays being shown by dotted lines; and, further, with a possible alternative position for the device being partly shown in dot and dash lines.

Fig. 2 represents a diagrammatic perspective view in which there is shown in full lines certain parts of a device of the character illustrated in Fig. 1, and by dotted lines the imaginary outlines of the light beams produced thereby, and, further, by dot and dash lines the imaginary outlines of the light patterns that such light beams effect upon a plane perpendicular to the center axis of such device.

Fig. 3 represents a view similar to that of Fig. 1 of a possible variant and modified embodiment which likewise casts light downwardly, and, because of the presence in the device of this view of a certain additional structural element, a further lighting effect is cast diagonally down to one side.

Fig. 4 represents a sectional view taken along the section line 4—4, in Fig. 3, looking in the direction of the arrows.

Figure 5:
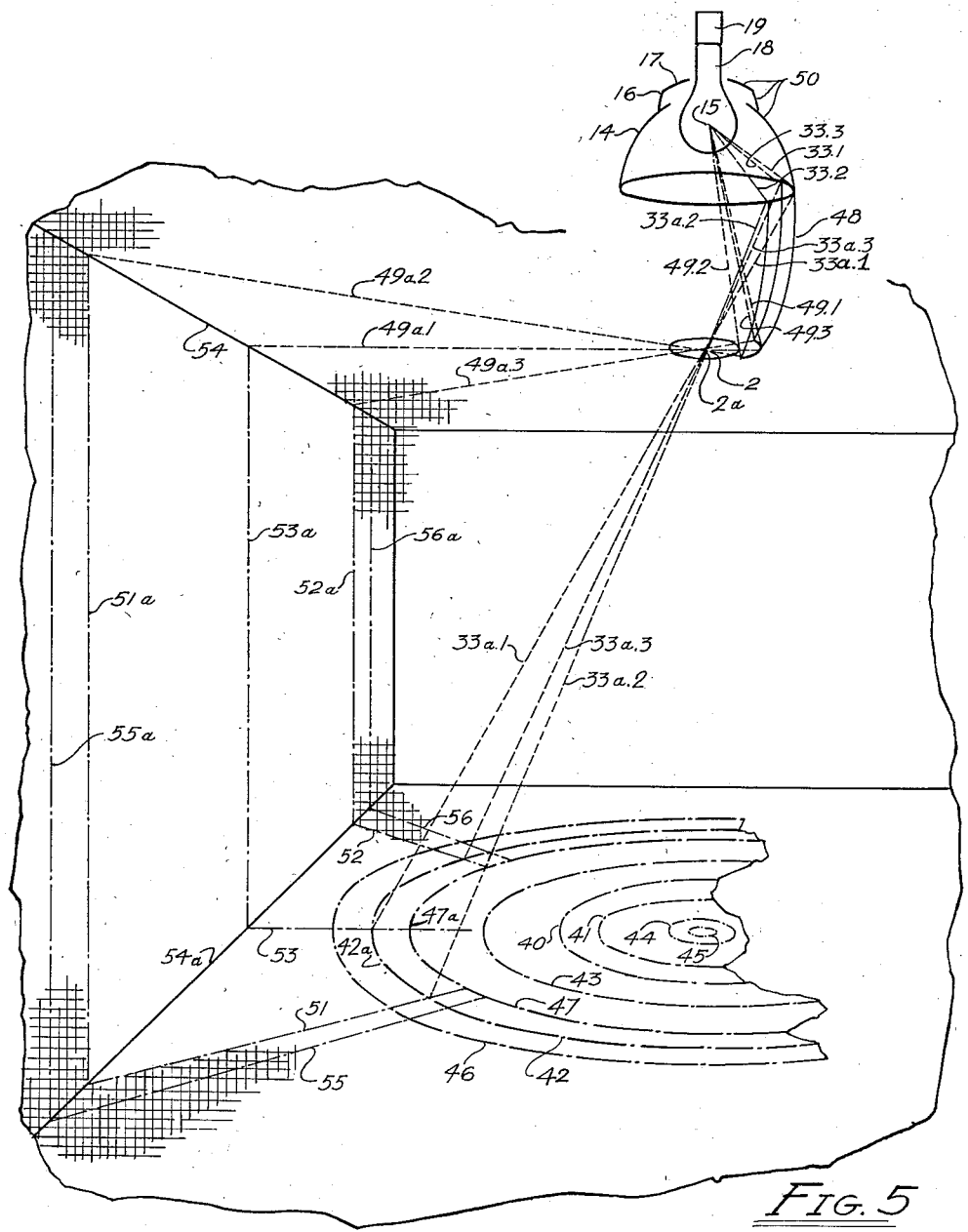

Fig. 5 represents a diagrammatic perspective view similar to that of Fig. 2 in which there is shown in full lines a device of the character illustrated by Figs. 3 and 4, and by dotted lines the imaginary outlines of the light beams produced thereby, and, further, by dot and dash lines the imaginary outlines of the patterns that such light beams effect upon the surfaces being illuminated by this device.

Fig. 6 represents a view similar to that of Fig. 1 of a second possible variant and modified embodiment in which there is illustrated certain vertical louvres and means for adjusting the axial position of the light source, either or both of which may be readily adapted for use in any or all of the embodiments of our invention.

Fig. 7 represents a bottom view of the structure illustrated in Fig. 6.

Figure 8:
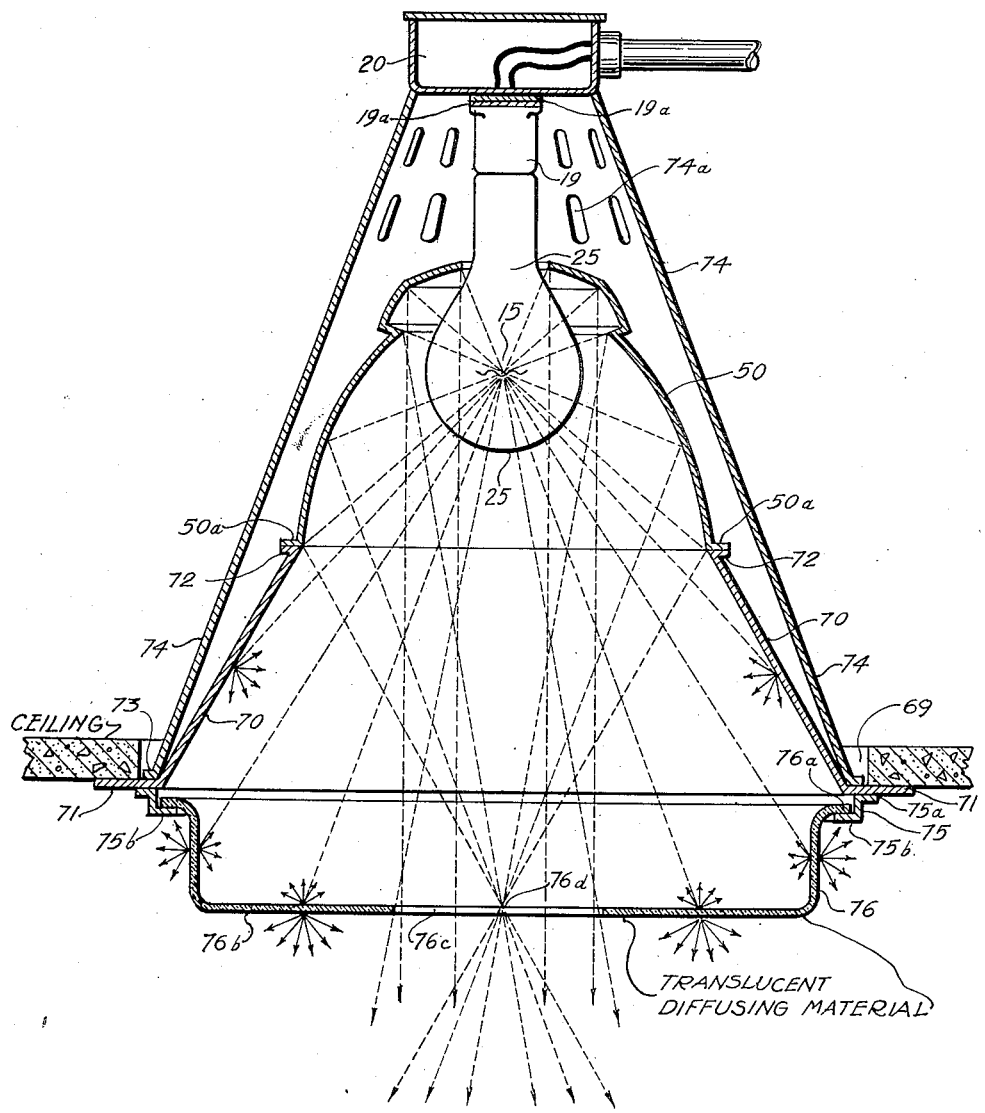

Fig. 8 represents a view similar to that of Fig. 1 of a third possible variant and modified embodiment in which embodiment reflective diffusing and translucent diffusing materials are advantageously employed in an illuminating device constructed in accordance with the principles of our invention.

Figure 9:
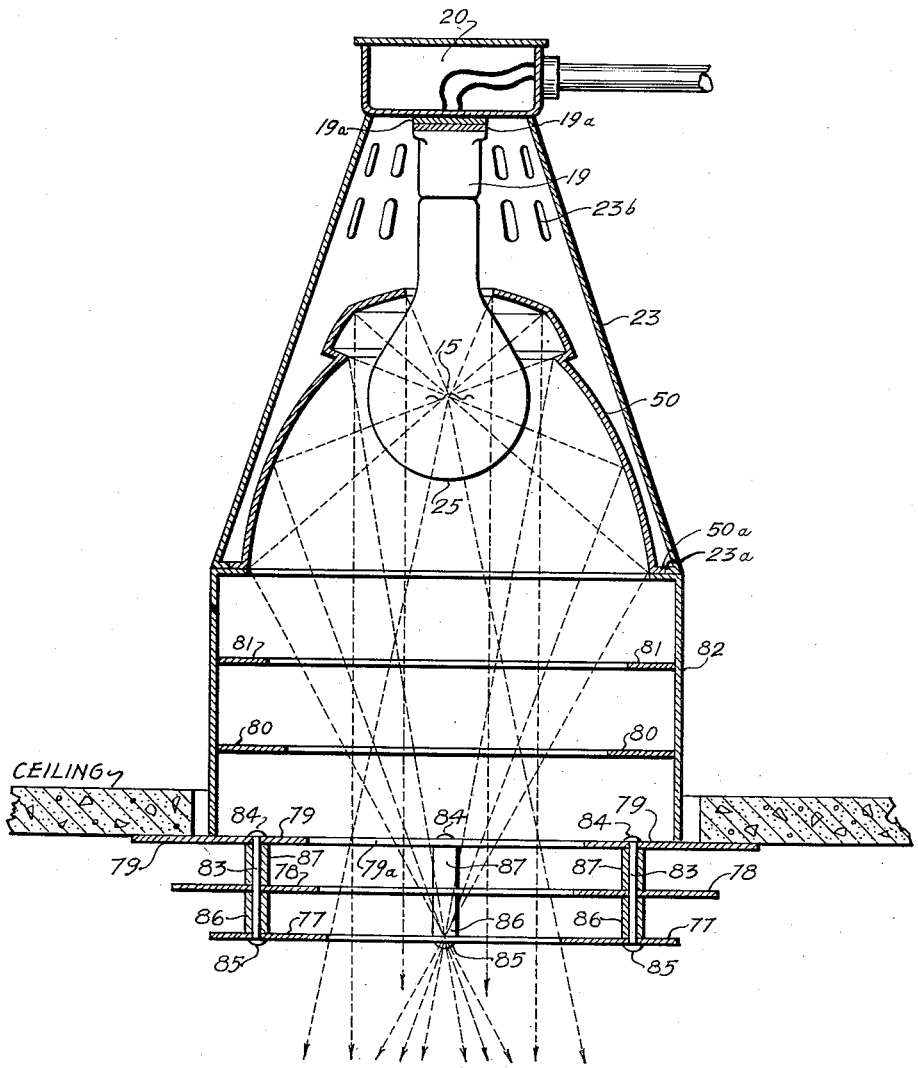

Fig. 9 represents a view similar to that of Fig. 1 of a fourth possible variant and modified embodiment which, among other things, differs from the construction illustrated in Fig. 1 in that, certain horizontal annular baffles are disposed below the ceiling line.

Fig. 10 represents a side elevation view in section of a fifth possible variant and modified embodiment adapted to use in cases where it is desired that the entire illuminating device be disposed below the ceiling and encased to a desired extent within a suitable housing.

Fig. 11 represents a partly broken away bottom view of the construction shown in Fig. 10.

Fig. 12 represents a side elevation in section illustrating a possible modified form of reflector which alternatively may be used in our illuminating devices instead of the reflectors illustrated in the preceding views with the source of illumination being shown in full side elevation and partly broken away.

Fig. 13 represents a side elevational view in section of a reflector unit which may be adapted to use in illuminating devices constructed in accordance with the principles of our invention, contiguous to the reflecting surface of which, is disposed a suitable sheath of a material having the inherent property of readily absorbing radiant heat energy.

The present invention, in the main, is directed to the casting of light either generally downwardly, generally diagonally down to one side, or both, to wit: to certain lighting effects which, as a matter of convenience, we hereinafter respectively refer to as either downlighting, sidedownlighting, or back.

A very important characteristic of the devices which we herein disclose, resides in the fact that each of them is so constructed that neither the light source proper, specular reflections thereof, nor any glare whatsoever from either, are visible except when viewed by one at a point within an area illuminated by the device and who looks into the device along the direction of an emanated light ray originating at the light source. Thus, in the employment of our devices, the possibility of glare is to a large extent obviated. Moreover, as will be hereinafter noted, we accomplish all this without materially detracting from the lighting efficiency, effectiveness, economy or convenience in the making, installation and use of our illuminating devices.

In considering the disclosure hereinafter contained, it also should be borne in mind that the devices herein illustrated and described are intended to operate efficiently when using as sources of illumination standard high-powered electric lamps made of ordinary lighting service; and, further, that such devices, in order to give satisfactory service, do not require, although they obviously may advantageously employ, concentrated filament or spotlight lamps or any other lamp intended as an approximation of a theoretical point source of illumination.

Referring now to the drawings, it will be noted that we have shown in Fig. 1 an illuminating device constructed in accordance with the principles of our invention, which is illustrated as supported upon a ceiling plate 1 mounted against the lower surface of a ceiling under a suitable hole 1a, with the said device extending upwardly from the upper surface of said plate through the said hole 1a into the space above the ceiling. The ceiling plate 1 is provided with a circular aperture therethrough 2. This illuminating device of ours has a body portion 3 which is hinged in a suitable manner to the ceiling plate 1 by a hinge 4. The body portion 3 is shown in Fig. 1 as having an inverted truncated cone-like form, but it will be readily understood that such body portion may be of any other suitable shape. It will be observed that diametrically opposite to the hinge 4 we show an eye-bolt 5 which is pivotally linked to the ceiling plate 1 by an eye ring 6, or other suitable pivotal structure, which is riveted or otherwise suitably secured to such plate. Rigidly secured to the external surface of body portion 3, adjacent to the bottom thereof is an outstanding lug 7 through a hole in which the eye-bolt 5 extends, with the position of the lug 7 along the longitudinal length of said eye-bolt with respect to the ends thereof being susceptible of adjustment by an upper locknut 8, threaded on said eye-bolt 5 above said lug 7, and a lower locknut 9 threaded on said eye-bolt 5 below said lug 7. It will be readily understood that by suitably adjusting the locknuts 8 and 9 on the eye-bolt 5 that the lug 7 may be moved from the lowermost position therefor shown in Fig. 1 upwards along the length of eye-bolt 5 to any desired degree, and there locked in position by such lock nuts. Such lug being rigidly secured to the body portion 3, it will be further understood that the body portion will be accordingly swung, on the hinge 4 through an angle with respect to the ceiling plate 1, away from the full line position shown therefor in Fig. 1, and into a possible tilted position, such for example, as the tilted position partly shown with dot and dash lines in Fig. 1.

We desire, at this point, that it be understood that the parts just herebefore mentioned, to wit: the body portion 3, the eye-bolt 5, the ring 6, and the lug 7, held by locknuts 8 and 9 as herebefore described, must all be so suitably proportioned and positioned with respect to each other that a free tilting action of the body portion 3 may be readily attained without said body portion and the eye-bolt 5 in any way binding against or interfering with each other. It should be further understood that this necessitates the proper vertical positioning of the lug 7 along the length of the side of body portion 3 as well as the leaving of appropriate clearance between the body portion 3, the eye-bolt 5 and the ring 6 for freedom of swing of parts.

It will be here, of course, appreciated that while we have just disclosed one suitable construction adapted to the effecting of ready tilting of our illuminating device upon and with respect to the ceiling plate 1, we realize that other suitable constructions for effecting tilting, when and if desired, will readily suggest themselves to those skilled in the art, and it accordingly will be understood that the tilting mechanism we have just described is intended by us as purely illustrative and in no sense limiting.

Indeed, in a certain sole patent, heretofore granted to one of us, to wit: Edward Rambusch, namely: United States Letters Patent No. 2,094,670 of October 5, 1937 for "Illuminating apparatus", another possible convenient device tilting mechanism is taught which might find ready adaptation and utilization in the embodiments of our invention herein disclosed.

It will, of course, be readily understood that the effect of tilting of the illuminating device will have the result of altering the direction of the light beam, in accordance with the degree of tilt provided by the user.

Turning next to the interior of body portion 3, it will be observed, that we provide a plurality of parallel annular baffle plates, 10, 11, 12, and 13, suitably secured within said body portion 3 to the interior surface thereof. These annular baffle plates are axially spaced apart along and perpendicular to the imaginary center axis of the body portion 3, with the center of each of said annular baffle plates lying in the line of such axis. As will be observed from an inspection of Fig. 1, these annular baffle plates are disposed one above the other, as illustrated; and the ceiling plate 1, having opening 2 therein, cooperates with these baffle plates and acts like another baffle plate.

It will next be observed that body portion 3 is provided at its top with an annular flange 3a lying parallel to the said baffle plates, said flange having therein a hole 24, the center of which also lies in the line of the center axis of body portion 3. We have found that all of the hole diameters preferably should be so arranged that (considered with the device not tilted at the hinge 4), starting with the hole 24, each succeeding hole down to, and including, hole 2 in the ceiling plate 1 has a progressively smaller diameter. This progressive decrease in hole diameter preferably varies in direct proportion to the axial spacing of the plates downwardly from the flange 3a along the imaginary center axis extending through the body portion 3.

Disposed above body portion 3 we mount our reflector 50 which, will be more fully hereinafter described, in a suitable manner such as by providing the same with a flange 50a, which is secured upon and to the flange 3a of body portion 3. Within reflector 50 we dispose an electric lamp 25 the neck 18 of which extends upwardly through a hole 17a in the top of reflector 50 and is so disposed that the base of such lamp is held in a conventional suitable fashion in an electric lamp socket 19, which depends from an outlet box 20.

Said box 20 is mounted at the top of an upper body portion or housing 23, which portion provides a satisfactory enclosure occupying a minimum of space, excluding dust and dirt from settling into our device and providing adequate protection for the reflector and adjacent parts, as well as support for the said outlet box 20. Thus, this portion 23 may be in any suitable form adapted to provide these advantages, such for example, as the truncated cone-like form which we have illustrated therefor in Fig. 1. At its bottom the upper body portion 23 is formed with a flange 23a which is secured upon and to flange 3a externally concentric to the flange 50a.

It will be understood that the hole 17a, lamp 25, socket 19, box 20 and upper body portion 23 are so arranged that they have a common center axis coincident with the upward prolongation of the imaginary center axis of the body portion 3, with the result that the said imaginary center axis of the body portion 3 appropriately prolonged will be hereinafter referred to and considered as the center axis of our device.

It will be further understood that hole 17a is of such diameter that not only may the neck 18 of the lamp 25 be readily passed therethrough but likewise, while a lamp neck extends therethrough, a sufficient clearance between the outer glass envelope of the lamp neck 18 and the internal periphery of hole 17a is presented, so that a substantial flow of heated air may readily exit upwardly around and about the neck 18 of lamp 25, thereby providing adequate ventilation for the air which is heated in the operation of our device, in the space beneath the internal reflector 50. Escape for this heated air, in turn, from the interior of upper body portion 23 is provided by a plurality of suitable vents or perforations 23b extending completely through the thickness of upper body portion 23 to atmosphere.

Referring to outlet box 20 it will be understood that the same may be of any suitable construction, and has been shown by us in the drawings as being covered by a removable plate 21 permitting of ready access to the interior thereof. Suitably connected to box 20 on one side thereof we have shown a conduit 22 for the electrical conductors entering our device.

Turning now to the reflector 50 we may say that we have found that to best attain our objects hereinbefore set forth that the internal surface of our reflector 50 preferably should represent a compound of a number of properly associated surfaces, to wit: those shown by us in Fig. 1, as 14, 14a, 16 and 17, with each of the named surfaces being of different geometric character. The resulting surface of our reflector 50 we believe may here be best described by defining the same as such compound surface as is generated upon the revolution, about the center axis of our device, of an irregular element or generatrix composed of the following lines joined end to end in the following order:—(1) a lowermost curved line which is part of an ellipse (having its upper focal point on the center axis of our device at a point indicated in Fig. 1 as 15, and its lower and conjugate focal point 2a likewise on the center axis of our device and coinciding with or lying near the center of aperture 2) and which upon revolution generates a lowermost reflector surface 14, which is a zone of an ellipsoid, (2) a first intermediate line which is straight and sloping, and which upon revolution generates an intermediate connecting surface 14a, which is an inverted frustrum of a cone having relatively large upper and lower bases in comparison to its height, (3) a second intermediate curved line which is part of a circle, having its center at 15, and which upon revolution generates an intermediate reflector portion 16, which is a zone of a sphere, and (4) an uppermost curved line which is a part of a parabola, having its focal point likewise at 15, and which upon revolution generates an uppermost surface 17, which is a zone of a paraboloid.

The result is that the respective surfaces which form our reflector 50 are so related to each other that the upper focus of the ellipsoidal zone 14 and the focus of the paraboloidal zone 17 concide at the point 15, which point also is the center of the spherical zone 16.

As will be gathered hereinafter, the location of the lamp 25, so that the theoretical light center of its filament falls at the point 15 results in certain cooperative interaction between the lamp filament, acting as the source of illumination, and the various zones comprising our reflector 50, which interaction is productive of the lighting effects we desire. We accordingly desire that the theoretical light center of the filament of each lamp employed in one of our devices should fall at such point 15, as near as practically possible. In order to effect proper disposition of the lamp so that the theoretical light center of its filament is thus located, it is necessary that for a given reflector 50 the axial position of the socket 19 be predetermined by calculation, so that for a given lamp the position of such socket is such that the theoretical light center of the filament does fall at 15.

In present day practice, standard lamps of a given rating and type are uniformly produced with physical dimensions substantially constant; and, accordingly, the distance between lamp base tip and lamp filament in standard lamps of a given rating and type is also substantially constant.

Hence, should occasion arise for relamping, once the socket 19 has been appropriately axially positioned and set for a standard lamp of given rating and type, our device, to continue to function properly, merely requires that a standard lamp of like rating and type be employed, without change in the axial position of the socket 19.

However, as one, from time to time, might desire to use in the same one of our illuminating devices, lamps differing in rating, type or both, having different lengths between the base tip thereof and the theoretical light center of the filament thereof, and as the proper functioning of our devices presupposes that the theoretical light center of the filament of any lamp employed should fall at and coincide with the common point 15, suitable mechanism for effecting adjustability in lamp axial position may be incorporated in our devices to provide ready means for setting the theoretical light center of the lamp filament into proper position at point 15, such, for example, as by interposing a shim or shims 19a between the base of socket 19 and the bottom of outlet box 20, or by the incorparation of any other suitable device for making the lamp socket 19 adjustable along the length of the center axis of the device. In connection with the embodiment which we hereinafter show in Fig. 8 we have illustrated one suitable form of typical adjusting mechanism for such purpose, which will be more fully hereinafter described, and which could be employed in any or all of our illuminating devices herein disclosed for effecting appropriate axial adjustment, when required.

It, of course, still further will be understood, that any other suitable means for effecting appropriate adjustment in the axial position of the filament might be used for this purpose, and, accordingly, the particular forms of adjusting means which we herein disclose, in connection with Figs. 1 and 6, should be considered purely as illustrative and not in any sense as limiting.

With further regard to the structure of reflector 50 we desire that it be noted that the inner surfaces of our reflector 50 are of such character that they have very high light reflection properties. This end is attained in any suitable fashion such as by fabricating the reflector of a suitable material such as metal or the like and highly polishing or otherwise suitably treating the reflecting surfaces thereof or by the use of glass surfaces on the outer side of which a light reflecting material has been applied. The light reflecting properties may also be obtained by the use of appropriately shaped and positioned prismatic glassware or indeed by any other means well adapted to make the inner surfaces of the reflector 50 of the desired high reflection properties.

At this point we further desire to bring out that, employing such materials and light sources as are commonly available in present day usage, that we have found it preferable, in the use of our illuminating devices, that the light emitted from the source should be somewhat diffused, for reasons which will become fully apparent hereinafter, and that this may be conveniently best attained, at the present time, by the employment of frosted lamps.

In connection with the foregoing we, of course, appreciate that it is conceivably possible that, with and upon further advance in the lighting art, other media may be developed either for use as reflector surfaces proper or for affixment to reflector surfaces, or better and more concentrated light sources may be developed, one or more of which will obviate the advantages we have found to inhere in the employment of frosted lamps as light sources; and, we therefore make reference to frosted lamps as light sources purely by way of illustration, and not in any sense whatsoever as limiting our invention.

Before leaving this description of the construction of our device illustrated in Fig. 1, we desire to point out that all portions of the inner surface of body portion 3, all surfaces of the baffle plates 10, 11, 12, and 13, and the part of the upper surface of ceiling plate 1 which is bounded by the inner edge of the lower rim of body portion 3 are preferably given a dark or black finishing color for reasons which will become fully apparent, shortly hereinafter.

Having now described the device shown in Fig. 1, we now desire to explain how it provides our desired light distribution and lighting effects, when in use.

To explain the functioning of such device, we have indicated by dotted lines in Figs. 1 and 2 a plurality of typical light rays which we hereinafter employ for purposes of illustration.

Assuming for the present that our device is not tilted, to wit: that it is in the operating position shown therefor by full lines in Fig. 1, and our light filament as though concentrated into a theoretical point source located at the point 15, and further assuming the hole 2 in ceiling plate 1 to be a geometrically exact circular orifice, we now describe the lighting effects produced, as follows:

As will be observed from the relative positions of point 15 and aperture 2, in Fig. 1, such aperture will permit a certain limited conical beam of light, emitted from the point 15, to pass directly out through aperture 2. The proportions of this beam will be determined by the diameter of aperture 2 and the distance of the center of such aperture from point 15. Rays 26 are what may be termed limiting rays defining this conical beam; that is, they are rays which emanate out through aperture 2 at the greatest possible angle away from the center axis of our device permitted by such aperture. Each of such rays under the circumstances may be accordingly considered as an element or generatrix of a right circular cone of light which has its vertex at 15 and its center axis collinear with the center axis of our device.

Rays 27, 28, 29, 30, 31, and 32 are typical light rays emitted directly from 15 and are representative of the light falling upon parts of the inside surface of the body portion 3, upon the upper surfaces of the baffle plates 10, 11, 12 and 13 and part of the upper surface of ceiling plate 1. It will be instantly appreciated that baffle plates 10, 11, 12 and 13 and part of the upper surface of ceiling plate 1 intercept some of the light rays emitted by and coming directly from the light source 15, and, accordingly, place the under surfaces of such baffles and parts of the inner surface of body portion 3 in shade, thereby limiting the extent to which the inner surface of body portion 3 is illuminated.

It next should be understood that an important effect of the presence of upper surface of ceiling plate 1, and annular baffle plates 10, 11, 12 and 13 and the inner surface of body portion 3, particularly when same are provided with a suitable dark or black finish, is that they will intercept and substantially completely absorb all such light as is emitted by the source and which, while falling below the flange 3a, does not exit through aperture 2. This means, in turn, that the interior of body portion 3 is not brightly lighted by such light and accordingly that an observer looking through aperture 2, at the inner surface of body portion 3, is not subjected to any unpleasant glare sensations therefrom.

Rays 33, 34, and 35 are three typical rays of light which originate at the point source located at focal point 15 and impinge upon the ellipsoidal portion 14 of reflector 50. When these rays impinge on the surface of reflector portion 14, they are thereby reflected as rays 33a, 34a and 35a which converge at, pass through and continue on down divergently from the lower and conjugate focal point 2a of the ellipsoidal surface 14. This conjugate focal point coinciding with the center of the aperture 2, it necessarily follows that these light rays passing through 2a provide a beam of light diverging as though originating from the center of aperture 2. The light beam created by all the rays falling upon and reflected from the reflector portion 14 and thereafter converging to, passing through 15 and diverging from the focal point 2a, has a geometrical configuration, which we believe can best be described, as, having a shape bounded by a right circular cone nested within a right circular cone, said cones having a common vertex at 2a and a common central axis which is collinear with the center axis of our device; and said cones further being such that the outer is generated by revolving ray 33a about the center axis of our device, while the inner is generated by revolving ray 35a also about the center axis of our device.

Light rays 33b and 34b, which are emitted by the source 15, in line with, but in opposite directions to, light rays 33 and 34, impinge on the spherical reflecting surface 16 of reflector 50. As reflector surface 16 has the point 15 as its center, the rays 33b and 34b are reflected thereby to and through the source 15, whence they continue in directions diametrically opposite to the directions of their original emission. Thus, they follow, are collinear with and amplify the strength of the rays 33 and 34, and that of the corresponding reflected rays 33a and 34a. Since innumerable other rays occur between the rays 33 and 34 as well as between rays 33b and 34b, such amplifying effect is worked upon all the rays occurring between 33 and 34, and between 33a and 34a, respectively. It will thus be seen that the effect of the spherical reflector surface 16 is to increase the light flux falling upon that zone or portion 14b, of ellipsoidal reflector surface 14, which lies between the lower circular edge of such reflector surface and such imaginary circle thereabove (represented by the dot dash line 14c, in Fig. 1) as would be described upon such ellipsoidal surface 14, as the path, which would be taken by the point of impingement of ray 34 upon the surface 14, were such ray carrying therewith its point of impingement, revolved about the center axis of our device. This accordingly results in a corresponding flux increase in the outer portion of that light beam which is due to the ellipsoidal reflector surface 14.

Rays 36 and 37 are rays of light emitted by the source 15 which impinge on the paraboloidal reflector surface 17. As the point 15 is the focal point of that paraboloid of which the reflector surface 17 is a portion, and as the said point 15 falls on the center axis of our device, which axis is collinear with the axis of said paraboloid, it follows that the light rays 36 and 37, upon impinging on the paraboloidal reflector surface 17, will be reflected therefrom as 36a and 37a, respectively, and said rays will be each parallel with respect to the center axis of our device. Since, between rays 36 and 37, there will be innumerable other rays which are emitted by the source 15, and which impinge upon the reflector surface 17, and from there are reflected in parallel downward directions, a cylindrical tube-like beam of light is created, having the center axis of our device as its center axis. This light beam has a geometrical configuration which, we believe, can best be described as having a shape bounded by a cylinder within a cylinder, with both cylinders having a common central axis which is collinear with the center axis of our device; said cylinders being such that the outer is generated by revolving ray 36a about the center axis of our device, while the inner is generated by revolving ray 37a about such axis, also.

Before proceeding to a discussion of Fig. 2 we desire to point out that all of the light rays shown in Fig. 1, as emanating from the aperture 2 of our device, there illustrated, find their counterpart in imaginary outlines of the light beams illustrated by dotted lines in Fig. 2, which are appropriately, corresponding numbered.

We further desire to point out that in the following discussion of Fig. 2 we will continue with the hereinbefore mentioned assumptions, namely, that our device is untilted, to wit: that it is in the operating position shown, therefore, by full lines in Fig. 1; that our light filament is as though concentrated into a theoretical point source located at the point 15; and further, that the aperture 2 in ceiling plate 1 is a geometrically exact circular orifice.

Referring next to Fig. 2, it will be observed that we have there illustrated diagrammatically a perspective view in which there is shown a broken away corner of a room with certain parts of one of our devices, of the character illustrated in Fig. 1, being shown, in full lines, disposed above the ceiling; and in which there is also shown, by dotted lines, the imaginary outlines of the light beams which are produced by such device and which pass through the aperture 2 in said ceiling, and, by dot and dash lines, the imaginary outlines of the light patterns which are effected upon a certain opaque plane perpendicular to the center axis of our device; such, for example, as the floor; when such plane intercepts the light beams; said imaginary outlines of the light patterns being a plurality of concentric circles which are illustrated perspectively in this figure as a plurality of ellipses, the respective major axes of which, are collinear.

Turning now to the description of the imaginary circular outlines of the said light patterns, which are perspectively represented by dot and dash elliptical lines, in Fig. 2:

The circle 40 represents the outer boundary of the circular area which receives light from the conical light beam originating at the source 15 and directly passing from there unobstructedly through aperture 2, which beam is defined by the rays 26.

The circle 41 represents the inner boundary, and the circle 42 represents the outer boundary, of the annular area or band which receives light from the light beam coming from the whole of the ellipsoidal reflector surface 14, which beam is defined by rays 35a and 33a respectively.

The circle 43 represents the inner boundary, and the circle 42 represents the outer boundary, of the annular area or band which receives light from that light beam which is defined by the rays 34a and 33a, and which beam comes from that portion of the whole of the ellipsoidal reflector surface 14 as has been hereinbefore identified as zone 14b; said beam including such light as was received directly on the said zone from the source 15 and was directly reflected therefrom out through aperture 2 (the same constituting a part of the beam mentioned in the paragraph immediately preceding this paragraph), as well as such strengthening light as was received in the first instance from the source 15 directly on the spherical reflector surface 16, and thereby reflected to the zone 14b from which it was again reflected out through aperture 2.

The circle 45 represents the inner boundary, and circle 44 represents the outer boundary, of the annular area or band which receives light from the cylindrical tube-like beam of light coming from the paraboloidal reflector surface 17, which beam is defined by the rays 37a and 36a respectively.

From the foregoing, it will be immediately clear, based upon the assumptions which we hereinbefore have made, that the reflector 50 will furnish no light on the area within the circle 45, nor upon either of the following areas, to wit: that which lies between the circles 44 and 41, and that which lies externally without the circle 42. However, it should be observed that, while the reflector 50, under the stated conditions, does not furnish any light to the said areas, the area lying within the circle 40, as hereinbefore explained, receives light from the direct conical beam which originates at the light source 15 and is defined by the rays 26; and, since the area lying within such circle 40 includes that area which lies within the circle 45, as well as that area which lies between the circles 44 and 41, these two last mentioned areas do receive light from the said direct conical beam. From this it will be appreciated that, under the stated conditions, the area which lies externally without the circle 42 does not receive any light from either the reflector 50 or from the said direct conical light beam.

To illustrate all of this, we have, in the drawings, represented by appropriate symbols, as though gray, those areas which receive no light from the reflector but do receive some light from the said direct conical beam, and as though black, that area which receives no light from either the reflector or the said conical beam.

We now wish to point out the part which the spherical reflector surface portion 16 plays towards the attainment of the desired substantially uniform intensity of light over that limited area now being considered. Since we have assumed a theoretical point source, which emits substantially equal light flux in all directions, and since upper zones of reflector surface 14, in comparison with lower zones thereof, are nearer to the source 15, and have areas which are relatively smaller in size than those of lower zones, it follows that the light flux falling on the upper zones of reflector surface 14 will have less area upon which to fall; and, accordingly, will furnish thereupon a greater amount of light flux for each unit of said area. Moreover, since lower zones of reflector surface 14 necessarily have to provide light to and upon much larger and more remote floor areas than do upper zones, as will be observed in Fig. 2, it accordingly follows that the density of light flux falling on the area lying between circles 41 and 42 will gradually decrease as progressive travel is made downwardly from one zone of unit height to another on the reflector surface 14—with such progressive downward travel corresponding with appropriate progressive radial departure outwardly on the plane of the floor from the circle 41 to the circle 42. The decrease in light intensity being gradual in a radial direction from circle 41 to circle 42, the effect of such decrease becomes more visibly marked as approach is made toward circle 42. Thus, those zones of unit height lying nearest the bottom of reflector surface 14 which go to make up that reflector zone thereof which we have hereinbefore identified as zone 14b, and which would be responsible for illuminating the outermost part of the annular area lying between circles 41 and 42, to wit: that lying between circles 43 and 42, are so positioned that they furnish light of lower intensity to the most expansive and distant area, than any part of the reflector surface 14 furnishes. In the interest of tending towards maintaining as nearly as possible, under the stated theoretical conditions, a lighting effect which is substantially uniform over the whole of the area lying between circles 41 and 42, we, therefore, compensate for the decrease or falling off of intensity in that portion of such area where it is most marked, namely, in the band lying between circles 43 and 42. We do this by utilizing some of that light flux which normally would not be used, that is, some of that flux which, were the reflector surface 14 alone employed, would pass out above the upper edge thereof and be lost. The spherical reflector surface 16 reflects such flux through the point source 15 and on to the zone 14b as additional light flux thereupon; with said zone, in turn, reflecting it upon the area lying between circles 43 and 42.

It will be readily understood that, neglecting all losses that in practice would be present, due to the fact that reflector surfaces are never 100% efficient, as well as such losses as would be occasioned by partial light interception and absorption by the source and the envelope surrounding the source, the sum total of the flux falling upon the spherical reflector surface portion 16 from the source 15 would equal that which falls upon the entire area of the zone 14b due directly to the source 15, in the first instance. Thus, the effect of redirecting the flux falling upon spherical reflector surface portion 16 to zone 14b means that the total flux falling on the entire area of zone 14b is exactly doubled. As a result of this, the light flux, which zone 14b then redirects downwards, is likewise doubled, and thus the light density, to wit: the light flux density falling in each unit of the area lying between the circles 42 and 43 is twice that which zone 14b would provide thereupon were the spherical reflector surface 16 not incorporated in our device. This, in conjunction with certain effects which we will shortly hereinafter more fully discuss, makes possible the accomplishment of our desired end, namely, the supplying of light of substantially uniform intensity over that floor area which we illuminate.

At this point we desire that it be clear that the circles which we have thus hereinbefore mentioned and described should not be considered as representing sharply defined lines of light contrast. As will shortly become apparent, such lines, to the contrary, are not at all present in practice. Indeed the same have been adapted and here discussed by us purely as imaginary circular lines to explain the working of our device from a theoretical standpoint. Thus, it will be readily understood from the description hereinafter contained, of those effects which are produced in practice when a source consisting of a filament having finite size enclosed in a diffusing envelope is employed, that no marked lines, divisions or boundaries could possibly be produced which would be visible to the eye of an observer.

Before passing on to a discussion of the practical results effected when a source consisting of a filament having finite size, enclosed in a diffusing envelope, is employed, we desire to make reference to the fact that, while the relative size and relation of ellipsoidal reflector surface 14 and spherical reflector surface 16 to each other may be varied by us from time to time to give a desired variation in the final downward distribution of light flux, we have found, in practice, a certain relation of those surfaces to each other to be highly satisfactory. Thus, we have found that we get highly satisfactory results when our ellipsoidal reflector surface 14 intercepts all light emitted from the source 15, within a zone extending from approximately 40 degrees below that plane which passes through 15 and is perpendicular to the center axis of our device to approximately 20 degrees above such plane; while our spherical reflector surface portion 16 intercepts all light emitted from the source 15 within a zone extending from approximately 20 degrees above such plane to approximately 40 degrees above such plane, and throws the light which it receives back onto a zone 14b extending from approximately 40 degrees below such plane to 20 degrees below such plane. However, as hereinbefore pointed out, it will be understood that such zones, within which either the ellipsoidal reflector surface 14, the spherical reflector surface 16, or both, intercept light from the source 15, may be varied to give desired variation in the ultimate downward distribution of the light flux.

As will be readily recalled, we have hereinbefore described the functioning of our device on the assumption that a theoretically perfect point source of light located at point 15 was employed. However, as has been hereinbefore mentioned the light sources commonly used in devices made in accordance with our invention are standard lamps made for ordinary lighting service which have filaments of finite size enclosed in glass envelopes, which envelopes usually are treated with a slight frosting on either the internal or external surface of such envelope. As the light source or filament of such lamp necessarily is not a point source, but rather in practice always is of finite size and due to the general diffusive effects caused by such treatment as is effected upon either the inner or outer surface of the envelope of the lamp, if any, the resultant light emitted through the aperture 2 does not consist, in practice, of the separate and distinct light beams, hereinbefore mentioned as those which would prevail if a point source of light were used, but instead, a general overlapping of such light beams occurs.

Rays 33.1, 38, and 39 illustrate how light rays coming from three typical points on a filament of finite size, to wit: from the theoretical light center and the extreme ends of such filament, would converge at a single point on the surface of the ellipsoidal reflector surface 14, assuming that the envelope of lamp 25 shown in the drawings neither diffused nor refracted such rays.

Before proceeding with further consideration of such rays, we desire to make reference to the fact that, the light source now under consideration being a filament of finite size magnitude, the light coming from the points we have just named will be coming from light emitting points of lesser intensity than the light which emanated from the concentrated point source 15, hereinbefore considered. Thus, the total light emission of the source is now being considered as being distributed over and emitted by and from a finite size body, to wit: a filament, and therefore from a multiplicity of points over the surface of such filament, with the understanding, naturally, that the sum total of the flux emitted from all of the points on the filament sums up to that flux which we heretofore have considered as being emitted by the point source 15. The one immediate result of this that we desire to be here particularly noted is that the total flux which now emanates from the theoretical light center 15 of the filament is decreased, so that the same is substantially equal to the amount of light flux which is being emitted by each and every other point over the length of the filament.

Returning now to rays 33.1, 38 and 39, it will be observed that these rays are reflected downwardly by and from the reflector surface 14 at their common point of impingement thereon; and rays 33a.1, 38a and 39a, as shown in Figs. 1 and 2, illustrate how these last mentioned rays diverge after having been reflected by and from the reflector at such point of impingement.

The angle of incidence being equal to the angle of reflection, it follows that the angle at which rays 38 and 33.1 converge to their common point of impingement is the same as the angle at which reflected rays 38a and 33a.1 diverge therefrom; and likewise, that the angle at which rays 39 and 33.1 converge to such point is the same as that at which reflected rays 39a and 33a.1 diverge therefrom. Thus, it is immediately apparent that this happens at each and every point over the whole of reflector 50 and each such point reflects not merely a single ray, but rather a multiplicity of rays coming from a multiplicity of points on the light emitting filament, with the reflected rays leaving the respective points of impingement in a multiplicity of different directions.

Following through to the result of the multiple reflecting action of each point on reflector 50, and for such purpose, considering the typical rays 38a and 39a, and particularly making reference to Fig. 2, it will be seen that such rays are so relationed with respect to the ray 33a.1 that, while the ray 33a.1 defines the circle 42, the rays 38a and 39a, respectively, intercept the floor at some distance outwardly and inwardly from circle 42, and define two further imaginary circles, to wit: the circles 46 and 47, respectively.

It will be understood from this that the rays falling between the circles 42 and 47 mingle with the other light rays falling on this area. While we have been considering but three typical rays coming from three typical points upon our filament, it will be appreciated, since said filament has finite size and the reflector 50 has finite dimensions, that there are an infinite number of such points which must be considered, and, accordingly that the circle 47 typifies only one of an infinite multiplicity of such circles that might be considered within the boundary of circle 42.

It thus becomes immediately apparent that the result of employing a finite sized filament source is to effect an intermingling and overlapping of the light rays, with each individual ray following a direction in full accord with the principles which we now have outlined. This, in conjunction with that further diffusive effect which results from a treated glass envelope, which effect we will shortly hereinafter discuss, results in a substantial uniformity of light intensity throughout the area lying within the circle 42, all of which further illustrates why there will be no lines of sharp light contrast within such area.

Referring again to the ray 38a it will be observed that, considering the point of impingement thereof upon the lower edge of the reflector surface 14, such ray under consideration emanates from the most remote point on the filament. Ray 38a and ray 33a.1 define a light beam which illuminates that annular area or band which has circle 46 as its outer boundary and circle 42 as its inner boundary.

It will be recalled that, in our previous consideration of the effects of a theoretical point source of light concentrated and located at point 15, we demonstrated that, under the stated theoretical conditions, the area lying without the circle 42 received no light either from the reflector 50 or the direct conical beam defined by rays 26. It now becomes apparent from the discussion in the last paragraph of the results that flow from the employment of a finite sized filament in practice, that with such a filament the imaginary outer boundary of the area, to be considered as lighted by our device, is the larger circle 46 rather than the smaller circle 42. In considering this, however, it should be borne in mind that the light falling between the circles 42 and 46 necessarily gradually decrease in intensity from that substantially uniform intensity which prevails within circle 42, as radial departure is made from the circle 42 to the circle 46, where, in the absence of any effects which would be due to enveloping the source in a light diffusing envelope (which effects will be further hereinafter considered), the intensity will have fallen off to zero.

The above-mentioned divergence of light rays 38a and 39a, inwardly and outwardly from the ray 33a.1 is typical of the effect which a finite sized filament occasions at every point on reflector 50, including those where the heretofore considered rays 33a, 34a, 35a, 36a, and 37a impinge.

Thus there will be a multiplicity of divergent rays leaving each point on reflector 50; and, hence there will be rays which diverge at such angles from all rays, including rays 35a, 36a and 37a, that the area lying within the circle 41, including therewithin the area lying within the circle 45, will be lighted as the result thereof. Moreover, a plurality of intermingled light rays will emanate from the finite sized filament and exit directly from aperture 2 in place of the single heretofore considered conical beam defined by rays 26. Accordingly, the areas within circle 41 are lighted not only by direct light from the filament, but also by the general overlapping and intermingling of rays occasioned by the divergence discussed, all of which is due to the employment of a finite sized filament.

Turning now to the glass envelope which conventionally surrounds the filament which is usually treated internally or externally with a slight frosting, it will be observed that a further overlapping and intermingling of light rays is caused by the diffusing effect of the envelope of the lamp 25. To consider such diffusing effect of such glass envelope an infinite multiplicity of points upon the surface thereof must be taken into consideration as though they were individual primary sources of illumination distributed about the point 15, with the result that the ray 38 may no longer be considered for purposes of discussion as a ray coming from a most remote point of the light source. Indeed, as is obvious, the virtual light source being more distributed, there are more remote points, with the result that, in practice, the diffusing effect of the glass envelope may be considered as producing some extreme ray 38a.1 (see Fig. 2), which will define some outermost imaginary circle on the floor, to wit: circle 46a. This circle 46a represents the outermost boundary of the greatest area that could possibly be lighted under the conditions of a source consisting of a finite sized filament enclosed in a light diffusing envelope, hereinabove described, and will represent, under such conditions, the boundary where the light intensity will have fallen off to zero.

Thus, it will be observed that the general effect of the diffusion due to the treatment of the glass envelope is that, within the circle 46, a further general intermingling and overlapping of rays is produced, due to the greater effective size of and wider distribution from the light source under consideration.

Accordingly, it becomes apparent from the foregoing that our device, in practice, gives light of substantially uniform intensity over a limited area at a predetermined locality on a given surface, to wit: within the circle 42. Moreover, it is further apparent that our device also provides a band of light surrounding such area, the intensity of the light in said band gradually decreasing from the intensity of light which prevails in the aforesaid area, to wit: within the circle 42, to zero, as progressive radial departure is made within said band away from the outer boundary of said area, to wit: from the circle 42, to the outermost boundary of the band, to wit: to the circle 46a; and that the boundaries of such band, to wit: circles 42 and 46a, are separated by a finite distance which is predetermined by the operating characteristics of our device and the characteristics of the lamp employed therein.

Turning now to Fig. 3 of the drawings, it will be observed that we have there shown a device substantially like that illustrated in Fig. 1, except for a number of structural differences which we will now point out:

Thus, in this view no mechanism for effecting tilting of the device is illustrated, but it will be readily understood that, if desired, a suitable mechanism for such purpose, such, for example, as the one which we disclosed in connection with Fig. 1, might be incorporated in this embodiment of our invention as well. Next, in place of the inverted truncated cone-like body portion 3, we here show a cylindrical body portion 48a.

Still further, there is suitably positioned within the body portion 48a, below the reflector 50, an added reflector surface 48, which, like reflector surface 14, is part of the surface of an ellipsoid. Surface 48 is of such character that the focus and conjugate focus of the ellipsoid of which it is a part, respectively, are coincidental with the focus and conjugate focus of the ellipsoid of which the reflector surface 14 is a part. Thus, reflector surface 48 may be a part of the same ellipsoid of which reflector surface 14 is a part, or of any other ellipsoid having the same focal points as those of the ellipsoid of which reflector surface 14 is a part. If the former (as is the case illustrated in Fig. 3), reflector surface 48 may be made either integral with, or as a separate part suitably secured to, the ellipsoidal reflector surface 14. If the latter, the upper edge of reflector surface 48 lies somewhat externally to the lower edge of reflector surface 14, and suitable positioning and securement of reflector surface 48, within body portion 48a with respect to reflector surface 14, is effected in any suitable fashion.

In this embodiment the baffle plates 10, 11, 12 and 13 are each provided with a suitable recess; with all of such recesses being so shaped and arranged that the reflector surface 48 will smoothly fit therein, without any part of any baffle plate extending in front of, or interfering with, the reflecting action of such reflector surface 48. One suitable way in which recessing of the baffle plates 10, 11, 12 and 13 may be effected for such purpose will be observed in Figs. 3 and 4.

The particular reflector surface 48 which we have shown in Fig. 3 may be best described as that portion of the surface of an ellipsoid which would be generated by revolving about the center axis of our device, through a limited angle of predetermined magnitude, a lower continuation part of that ellipse, a part of which upon revolution generated the reflector surface portion 14. As also will be gathered from the drawings the length of the portion of the ellipse thus revolved is prechosen as such that the particular surface 48 illustrated extends from the upper surface of ceiling plate 1 to the under surface of flange 50a. Fig. 3 being a sectional view taken at half such angle of revolution, naturally only one-half of the reflector surface 48 is shown, and the full angle of revolution thereof may be observed in Fig. 4.

Reflector surface 48 also may be briefly described as such surface as is generated upon the rotation, about the center axis of our device, through a predetermined angle, of an element or generatrix taken from an ellipse whose respective focal points coincide with the respective focal points of the ellipsoidal reflector surface portion 14. Thus, reflector surface 48 is a segment of a zone of an ellipsoid, the uppermost edge of the segment being limited by the bottom of the reflector surface portion 14, and the bottom edge thereof being limited by the upper surface of the ceiling plate 1.

We now wish to draw attention, at this point, to the fact that we have just described a particular possible reflector surface 48 which is positioned below our reflector 50. With this reflector surface formed as we have described same, certain side-down-lighting beams, which will be hereinafter more fully described, will be produced. These beams will be effective to produce certain side-down-lighting beam patterns upon a vertical plane, such as a wall or the like, if in a position to intercept the same, thereby providing desirable lighting effects on side walls and any article or articles that may be disposed thereupon or thereagainst. The particular beam pattern which will be occasioned by reflector surface 48 will, of course, depend on the shape and outline of such reflector surface. Since, as will be readily understood, the shape and outline of ellipsoidal reflector surface 48 could be varied from that herebefore described, if desired, it should here be understood that the particular form of reflector surface 48 which we have shown in Fig. 3 is representative of but one of many possible variant shapes as well as outlines that such reflector surface might have. Thus, by varying the height, width, and general outline of the ellipsoidal surface 48, different beams having different beam outlines, and which will occasion different beam patterns, may be produced, all as will become more fully apparent hereinafter. We wish, therefore, that the particular width, height and outline that we have shown for the particular reflector surface 48 which we have illustrated in Figs. 3 and 4, be considered as purely illustrative and not in any sense as limiting.

Aside from structural differences in the form of our device shown in Fig. 3 over that shown in Fig. 1, which we now have pointed out, such devices are otherwise substantially structurally identical.

Having thus described the construction of the form of our device shown in Figs. 3 and 4, we will now briefly describe the operation thereof. In the first place it should be noted that both from the viewpoint of theory and practice, reflector 50, lamp 25, and all other parts of such device, with the exception of reflector surface 48, will function in this embodiment in the same way that they function in the form of our device illustrated in Fig. 1. Thus, the same light beams will be created thereby, with the same resulting beam patterns being effected upon the floor of a room which is thereby lighted. The presence of the added reflector surface 48 in this embodiment will result in certain additional effects, to wit: certain side-down-lighting effects which we will now briefly describe.

As a matter of convenience in the following description we will again temporarily assume our light source as concentrated into a single point source 15, without any enclosing envelope, the device as untilted, and the aperture 2 as an exact circular orifice. We will further assume the ceiling plate 1 as if of no thickness and the surface 48 as being the particular surface hereinbefore described, to wit: as being part of the same ellipsoid of which reflector surface 14 is a part, with the lower edge thereof abutting against the upper surface of ceiling plate 1 and the upper edge thereof smoothly abutting against and uniformly following the adjacent corresponding portion of the lower edge of the reflector surface 14.

Under said condition the light ray 33.1 represents, as has been hereinbefore described in connection with the description of the operation of the form of our device illustrated in Fig. 1, a light ray emitted from the light source 15 impinging upon the lowermost edge of reflector surface 14 and the midsection point of the uppermost edge of reflector surface 48. This light ray is reflected downwardly at its point of impingement, as has been hereinbefore described, as ray 33a.1 and passes through and continues downward from the lower focus coinciding with the center 2a.

Ray 49.1 represents a ray which impinges upon the midsection point of the lowermost edge of reflector surface 48 and which is reflected downwardly as ray 49a.1 through and from the focus coinciding with the center 2a.

Referring now to Fig. 4, it will be observed that there is illustrated a sectional view taken along the section line 4—4, in Fig. 3, looking in the direction of the arrows, with the internal construction of the cylindrical body portion 48a appearing in plan in said view.

Referring again to Fig. 4, it will be observed that we have shown in plan in this view three lines 59, 60 and 61 which are projected plans of rays which extend from the center and each side of reflector surface 48 through center 2a of aperture 2. Thus, the line 59 represents a plan view of the rays 33a.1 and 49a.1, said rays all lying in one vertical plane in which the center axis of our device also lies. In this plane the rays 33.1 and 49.1 also lie, but since they are above the section line 4—4, they have not been presented by numbers in Fig. 4.

Next we will consider the two rays which impinge upon the uppermost and lowermost tips of reflector surface 48 on the one side edge thereof, which rays are shown in Fig. 3, as ray 33.2, which is reflected as ray 33a.2, and ray 49.2 which is reflected as ray 49a.2, respectively, with rays 33a.2 and 49a.2 converging to, passing through and diverging downwardly from the focus at the center 2a. On the other side of our reflector, (not shown in Fig. 3), a similar action takes place, and, as will be observed from Fig. 4, the rays which impinge upon uppermost and lowermost tips of the reflector surface 48 at that side are considered as ray 33.3, which is reflected as ray 33a.3, and ray 49.3, which is reflected as ray 49a.3 respectively, with rays 33a.3 and 49a.3 converging to, passing through and diverging downwardly from the focus at the center 2a. Accordingly, in Fig. 4 rays 33a.2 and 49a.2 are illustrated by the line 60; such rays and the center axis of our device all lying in a second single common plane, in which the rays 33.2 and 49.2 also lie, but above the section line 4—4. Furthermore, in Fig. 4 the rays 33a.3 and 49a.3 are illustrated by the line 61; such rays and the center axis of our device all lying in a third single common plane, in which plane the rays 33.3 and 49.3 also lie, but above the section line 4—4. Since rays 33.2 and 49.2 as well as rays 33.3 and 49.3 are all above section line 4—4, they likewise have not been presented by numerals in Fig. 4.

At this stage we desire to point out that the six rays and their reflections, which have been just mentioned and which will be herein considered, of course are but typical rays which impinge upon the reflector surface 48; same being here particularly chosen since they constitute rays which hit limiting points and hence points of major interest upon the reflector surface 48.

It should also be observed that the plane in which rays 33a.2 and 49a.2 lie, and the plane in which rays 33a.3 and 49a.3 lie, are separated by an angle which is the same as the angle through which the elliptical element or generatrix which generated reflector surface 48 was considered revolved.

Having thus described certain typical rays we wish to describe the light beam which in theory results from the employment of reflector surface 48. To do this we here first particularly refer to a certain one of the assumptions which we have heretofore made, to wit: the assumption that the ceiling plate 1 is of no thickness, that is, that the light rays 49a.1, 49a.2 and 49a.3 may all proceed along in the plane of the lower surface of the ceiling without interception at or due to the aperture 2. Upon such assumption our beam may be defined as follows: Thus, the upper surface of the beam is defined by the plane of the lower surface of the ceiling, which is perpendicular to the center axis of our device. One side of the beam is defined by that plane which passes through rays 33a.2 and 49a.2, while the other side of the beam is defined by that plane which passes through the rays 33a.3 and 49a.3. These last two mentioned imaginary planes will intersect at the center axis of our device and are separated by an angle which is equal to the predetermined angle through which the portion of the ellipse which generates the reflector surface

48 is revolved in the generation thereof. The fourth defining surface of the beam, we believe, may be best described, as being that portion of the surface of the cone defined by either the ray 33a.1, 33a.2 or 33a.3 as an element or generatrix, which is cut therefrom by the intersection of the hereinbefore mentioned side planes therewith, in their convergence towards the center axis of our device. All of the foregoing, carrying therewith the further condition that the center axis of that cone, a part of which provides the just mentioned fourth surface of the beam, the imaginary line of intersection of the converging planes, and a downward prolongation of the center axis of our device, are all collinear.

This beam of light can also be described as having the configuration of such a solid as would be generated by revolving the area which would lie between rays (a) 33a.1, 33a.2 or 33a.3, (b) 49a.1, 49a.2 or 49a.3, and (c) infinity, each in its indicated position about a downward prolongation of the center axis of our device, through the same angle through which that elliptical element or generatrix was considered revolved in the generation of ellipsoidal reflector surface 48.

As will be observed from an inspection of Fig. 5, the beam thus now described, when intercepted by an opaque plane perpendicular to the center axis of our device and a second opaque plane parallel to the center axis of our device, such, for example, as by the floor and the side wall of a room, as illustrated in Fig. 5, will create upon such planes certain light patterns of a desirable character, which we will now proceed to describe more fully.

Since the beam has the configuration which we have just described, the interception of such beam by the opaque plane of the wall will result in a light pattern falling upon said wall which is substantially rectangular in outline. Thus, rays 49a.2 and 49a.3 lying in the plane of the lower surface of the ceiling will subtend line 54 as the upper edge of said rectangle; and, the plane defined by rays 49a.2 and 33a.2, upon intersection with the wall, will subtend line 51a as one side of said rectangle; while the plane defined by rays 49a.3 and 33a.3, upon intersection with the wall, will subtend the line 52a as the other side of said rectangle; and, since the foot of line 51a and that of line 52a will each lie in the line of intersection between the side wall and floor, the line 54a which lies between the foot of line 51a and that of line 52a will constitute the base of said rectangle.

It will likewise be understood that the beam due to the reflector surface 48 will illuminate that portion of the floor lying between lines 51, 52 and 54a and that arc 42a of circle 42 cut off by the intersection of lines 51 and 52 with circle 42. Line 51 is a prolongation of the radial line extending from the point where a downward prolongation of the center axis of our device intersects the floor, through the point where ray 33a.2 intersects the floor as well as the foot of line 51a. Line 52 is a prolongation of the radial line extending from the point where a downward prolongation of the center axis of our device intersects the floor, through the point where ray 33a.3 intersects the floor, as well as the foot of line 52a. Thus, among other things, reflector surface 48 supplies some light to a segment of the area which surrounds the circle 42.

It will also be noted, since, theoretically, no light would fall outside the aforementioned areas on the wall or floor, that in Fig. 5 we have indicated by appropriate symbol, as black, the areas which lie without such lighted areas.

Turning now from the theoretical consideration of the operation of the device, which we have illustrated in Figs. 3 and 4, to the conditions which prevail when a filament of finite size with its theoretical light center at the point 15 is employed, disregarding all lighting effects due to the reflector 50, and only considering those due to reflector surface 48, it will be readily appreciated that, due to the fact that the filament has finite size, certain additional patterns will be effected besides those herebefore mentioned.

As is obvious, there, of course, will be no extra light in any event, above the upper line 54, since any rays which would be bent short of the plane of the under surface of the ceiling would not exit from the aperture 2 of our device. But, lying externally to line 51a, there will be a line 55a, and, lying externally to line 52a, there will be a line 56a, and, lying externally to line 51, there will be a line 55, and, lying externally to line 52, there will be a line 56, and, lying externally to arc 42a, there will be an arc 47a (cut off from that circle 47, hereinbefore discussed in connection with our discussion of Fig. 2, by the radial lines 55 and 56), all of which outer lines represent the outer boundaries of the additional areas which will be lighted, due to the fact that there will be a multiplicity of rays striking each point on the reflector surface 48 from a multiplicity of angles, which effect is like that which has hereinbefore been described as taking place when, in the form of our device disclosed in Fig. 1, a filament having finite size was considered as replacing the single point source 15.

Likewise, when the source employed is a standard lamp 25, that is, when the filament of finite size is enclosed in a glass envelope having a slight frosting, a diffusing action is presented by the envelope which results in additional outward extension of each of the outer boundaries of the beam patterns just mentioned, in a fashion akin to that discussed in connection with Fig. 2, where the diffusing action of the envelope was described as resulting in an extension of the outer boundary of the lighted area from the circle 46 to circle 46a.

Thus, it will be understood that light of substantially uniform intensity is provided on each unit of those beam patterns which we hereinbefore considered would be lighted by the beam under the assumed theoretical conditions; while proceeding uniformly from the outer boundaries of such beam patterns to the greatest extensions thereof, mentioned in the immediately preceding paragraph, the light intensity will decrease from that magnitude which it has within such patterns down to zero.

From the foregoing discussion of Figs. 3 to 5, inclusive, it thus becomes apparent that the form of our device which embodies an additional reflector surface 48 will provide, in use, the lighting effects hereinbefore mentioned as desired in the third and fourth object paragraphs hereof.

Turning now to the embodiment of our device, illustrated by Figs. 6 and 7, it will be observed that the construction of such embodiment is substantially identical with that shown in Fig. 1, except that in this second possible variant and modified embodiment we have not shown any mechanism for providing tilting, but have illustrated certain vertical louvres, and a further possible means for adjusting the axial position of the light source, either or both of which constructional features, when properly positioned, may be readily adapted for use in any or all embodiments of our invention.

Thus, in Figs. 6 and 7, it will be observed that we show a ceiling plate 1 having an aperture 57 therein which is an opening larger than aperture 2 in Fig. 1, and through which extends a vertical tubular louvre 58. This vertical louvre 58 is so arranged that its center axis is collinear with the center axis of our device. Secured to the internal surface of louvre 58 we have shown a plurality of arm or ribs 62, which are secured to and serve to support a second vertical tubular louvre 63, so that said louvre 63 likewise has its center axis collinear with the center axis of our device, with the result that louvres 58 and 63 have a common center axis collinear with the center axis of our device, and louvre 63 is to a greater or lesser degree nested within louvre 58. Both louvres 58 and 63 may each have an external and internal surface which is regularly and smoothly cylindrical, or of any other suitable shape, such as the corrugated surface particularly illustrated therefor in Figs. 6 and 7. We have found that these louvres to give the best results are preferably fabricated so that at least the internal surface of louvre 58, and both the internal and external surfaces of louvre 63, have a surface of high specular reflecting properties.

It will also be observed that the louvre 58 extends into body portion 3 to such an extent that only baffle plates 13, 12 and 11 are required, and that louvre 58 extends a short distance below ceiling plate 1, with the louvre 63 extending out from the louvre 58 by a distance substantially equal to the distance that louvre 58 extends below ceiling plate 1.

It, however, should be noted that the vertical distance between the bottom of louvre 58 and the top of the body portion 3 in this embodiment is substantially the height of the body portion 3 of the embodiment of our device illustrated in Fig. 1. Due to this and the further fact that in the embodiment of our device shown in Fig. 6, portions thereof, to wit: portions of the louvres 58 and 63, extend below the ceiling plate 1, the lower conjugate focal point for the rays falls some distance below the center 2a of ceiling plate 1, but yet above the lower rim of the vertical louvre 63.

It, of course, will be here appreciated that, in practice, the positioning of the respective louvres and the conjugate focal point may be varied, as desired. Accordingly, the particular arrangement of portions, which we have just mentioned, should be taken as, illustrative and not as in any sense, limiting.

By the embodiment of vertical louvres, which we have just described, an aperture of high decorative appearance is created. Due to the fact that the aperture 57, as hereinbefore explained, is an opening which is larger than aperture 2, more light may exit from our device with increased overall efficiency for the particular device being utilized.

Moreover, since in this embodiment, a plurality of illuminated bands replace the mere circular aperture, a lighting effect results, at the aperture, which, to some, presents increased visual interest.

The artistic and decorative effect of the aperture arrangement of the device is enhanced by the fact that in this embodiment, as hereinbefore mentioned, a suitable decorative configuration for the vertical louvre surfaces may be chosen, such, for example, as the corrugated surfaces illustrated.

It should be noted that the provision of vertical louvres 58 and 63, which have high specular reflecting properties, has the effect of specularly reflecting downwardly such light as happens to fall upon the internal surface of louvre 58, or the internal or external surfaces of louvre 63, without diffusion at such surfaces, and, accordingly, such surfaces do not act as though sources emitting diffused light in all directions.

It should also be noted that the theoretical operation of reflector 50 is the same, in this embodiment of our device, as we have hereinbefore explained it to be in connection with the embodiment of our device illustrated in Fig. 1.

We have found that such differences in beam patterns as may result from light rays impinging upon, and being reflected from, the reflecting surfaces of such louvres, is to generally add to the substantial evenness of illumination on the surface being lighted, in a desirable fashion.

It should, however, be clear that the effect of the vertical louvres is to present a decorative effect, to increase the intermingling of beams, and to increase the general overall efficiency of the form of our device in which they are incorporated.

Since, as shown in Fig. 6, these louvres extend below the ceiling plate tilting of the whole device may not be effected, and hence, no mechanism for effecting tilting has been provided in this embodiment. However, it is conceivable, in the event that the louvres 58 and 63 were so arranged that they would not extend down below the surface of ceiling plate 1, but rather were positioned immediately above the aperture, in a construction such as that shown in Fig. 1, that a suitable mechanism might be included for providing tilting of the whole device accompanied by a corresponding tilting of the louvres secured thereto. Accordingly, it will be readily understood, that, if desired, a device constructed in accordance with the principles of our invention may be readily made, which would embody, among other features, a tilting feature such, for example, as that shown in the embodiment illustrated in Fig. 1, in conjunction with properly positioned louvres of the character shown in the embodiment illustrated in Figs. 6 and 7.

Turning now to the upper part of Fig. 6, it will be observed that we have there shown, in place of the socket 19, of Fig. 1, secured to the bottom of the outlet box 20, a socket 64, having secured at the top thereof a hollow pipe 65, which is externally threaded and through the interior of which extend the wires intended for carrying the electric current to our lamp 25. The bottom of outlet box 20 is provided with an aperture 66, through which the pipe 65 extends. Mounted above the bottom plate of outlet box 20 is a locknut 67, and below such bottom plate is a locknut 68, each of which is threaded upon the pipe 65. As will be realized this presents a further construction, in which, by a suitable setting and locking of locknuts 67 and 68, the axial position of lamp 25 may be adjusted by raising or lowering into desired position, and there set.

Turning now to Fig. 8, it will be observed that we here present a third possible variant and modified embodiment, in which embodiment reflective diffusing and translucent diffusing materials are advantageously employed in an illuminating device constructed in accordance with the principles of our invention.

In this construction there is mounted a truncated cone-like body portion 70 which extends upwardly through a relatively large hole 69 in the ceiling. Body portion 70 has a lower external flange 71 by which it is secured directly to the undersurface of the ceiling, and has an upper parallel flange 72, upon which the flange 50a of a reflector 50 may be set and secured. Set upon the upper surface of flange 71, adjacent to the line of intersection between the external conical surface of body portion 70 and the plane flat upper surface of flange 71, is the flange 73 by which an enlarged truncated cone-like housing 74 is supported so that it encloses both the reflector 50 and the truncated cone-like body portion 70. Mounted atop the housing 74 is an outlet box 20 from which a socket 19 depends in fashion similar to that in which socket 19 depended from the upper portion of the form of our device illustrated in Fig. 1. The upper portion of housing 74 is provided with the vents 74a which provide a venting action like that provided by the vents 23b in the device of Fig. 1.

The theoretical light center of the filament of the lamp 25 which is secured in the socket 19 here falls, due to proper positioning, also at the point 15. This is arranged for either by arranging a suitable height to the body 74 or by the inclusion of suitable means for adjusting the vertical axial position of the lamp 25 or by both. Thus, for example, the illustrated shims 19a, or any other suitable mechanism may be used for such purpose. Secured to the lower surface of flange 71 is a ring 75 having an upper outwardly directed flange 75a secured to the flange 71, and a lower inwardly directed flange 75b upon which the flanged integral rim 76a of a bowl 76 rests and is supported. The internal surface of the body portion 70 is provided with a mat finish which renders the same an opaque diffusing surface, and the bowl 76 is formed of any translucent diffusing material. In the lower surface 76b of bowl 76 is a circular aperture or orifice 76c having a center 76d falling on the center axis of this form of our device; said center coinciding with the conjugate focal point of the ellipsoidal reflector surface 14 of reflector 50; and, such conjugate focal point, together with the point 15, comprising the foci of that ellipsoid of which reflector surface 14 is a part. It should be understood that the point 76d corresponds in all respects with the aperture center 2a, identified in Figs. 1–5, inclusive.

Having thus described the construction of the form of our device shown in Fig. 8, we will now briefly describe the operation thereof: Thus, such light rays as exit directly through aperture 76c, either directly from the source 15 or by reflection from the reflector 50, in this embodiment, will cause lighting effects, that is, light beams and patterns, exactly as they did in any one of the previous embodiments of our device. However, some light coming directly from the source of illumination will impinge, both upon the opaque internal diffusing surface of the body portion 70, and the internal surface of translucent diffusing bowl 76; and, upon impingement, such light will be diffused at the points of impingement, thereby creating a general luminous effect within the space lying between the internal surface of the body portion 70 and the internal surface of the bowl 76. This diffused light may be reflected back and forth, from 70 to 76, causing general intermingling and a general luminous effect within such space, and some of such light will pass through the translucent diffusing material of bowl 76 and be diffusely emitted from the external surface thereof.

Furthermore, anyone looking into our device through the aperture 76c, at such an angle that they see a portion of the internal surface of the body portion 70 will not appreciably notice the aperture 76c inasmuch as the diffusion taking place on the internal surface of the body portion 70 will cause a luminous effect on the eye substantially like that effect which is due to the diffused light which comes from the external surface 76b of bowl 76. When a standard lamp, of the character already described is employed, the diffusive effects due thereto tend to enhance the effects of internally lighting with diffused light the internal surface of the body portion 70 and the external surface 76b of the bowl 76.

Thus, it will be readily understood from the foregoing that, in the embodiment of our device illustrated in Fig. 8, we produce from the ceiling of the room that effect which alone would be present were light to be there emitted from a source of illumination contained within an enclosing bowl of translucent diffusing material, as well as such beams and beam patterns as have been already hereinbefore described in connection with Fig. 2 as coming from the reflector 50. Thus, an observer is given the impression that all that is present on the ceiling is merely an imperforate diffusing bowl with some source of illumination therebehind, although this device is producing the same beams and beam patterns as are produced by the form of our device illustrated in Fig. 1.

It will thus be seen that the embodiment which we have just described in Fig. 8 attains, in addition to the lighting effects which hereinbefore have been described for the embodiment of our device illustrated in Fig. 1, appropriate diffused light in all directions, and, accordingly, a soft lighting effect is thereby generally worked.

Turning next to Fig. 9, it will be observed that we show a fourth possible varient and modified embodiment which, among other things, differs from the construction illustrated in Fig. 1 in that certain horizontal annular baffles are disposed below the undersurface of the ceiling. Thus, in the embodiment of Fig. 9, we show five baffle plate elements 77, 78, 79, 80 and 81, with the baffle plate 79 constituting the ceiling plate, and with the baffle plates 77 and 78 being disposed therebelow. It will also be noted in this embodiment that the lower body portion 82 is cylindrical, like the body portion 48a in Fig. 3, but is of less height due to the fact that part of the height of the whole device shown in Fig. 9 extends downwardly below the undersurface of the ceiling.

It also will be observed that all parts above the body portion 82 in the construction of Fig. 9 are the same as like parts above the body portion 3 in the construction of Fig. 1.

In the construction of Fig. 9, the baffle plates 77 and 78 are supported in spaced-apart relation below the plane of the ceiling by any suitable means, such, for example, as by the illustrated plurality of pins 83 having flanged over ends 84 and 85, with the baffle plates being spaced-apart by the separating sleeves 86 and 87. However, it will be understood that any other suitable means for appropriately positioning the baffle plates 77 and 78 at proper relative spaced-apart positions may be employed, and, accordingly, we describe this construction as illustrative and, in no sense, as limiting.

The relative sizes of the respective holes in baffle plates 77 to 81, inclusive, are similar to those in the ceiling plate 1 and the baffle plates 10 to 13, inclusive; the variation in the diameter of which hereinbefore has been described in connection with our discussion of the construction of Fig. 1.

It will be understood from the construction which we have just described that certain rays of light will impinge upon the upper surfaces of all the mentioned baffle plates, including 77 and 78. The upper surface of baffle plate 77, the upper and lower surfaces of baffle plate 78 and the lower surface of ceiling plate 79 (which in Fig. 9 also acts as a baffle plate) may be either of diffusing or specular reflecting properties. Such light as falls upon the upper surfaces of baffle plates 77 and 78 may be due either to rays coming from the source 15 directly, or to diverging light rays reflected thereon from reflector 50.

Such light as does fall upon the upper surface of either baffle plate 77 or 78 will be reflected (either diffusely or specularly, depending on the nature of the surface of such plate), from such baffle plate to the baffle plate immediately thereabove; and such light, either immediately, or after a number of reflections back and forth from one baffle plate to another, ultimately will exit from between the baffle plates. The result of this is to present by this embodiment increased decorative effects by producing concentric halos of illumination concentric to the aperture of our device.

It will readily be realized that, if the baffle plates are of some other suitable form, other than annular, other desirable geometric illuminated configurations will be worked about the aperture 79a.

In order that the light-intercepting effects of the pins 83 and the separating sleeves 86 and 87 may be but a minimum, such pins, sleeves, or both, if desired, may be fabricated of a translucent material, such as glass, or the like. However, it will be realized that, even if, in the interest of a high degree of strength of structure, such pins and sleeves be made of an opaque hard material, still the degree of light interception effected thereby will not be of such magnitude as will materially detract from the decorative effect which will be worked by this embodiment of our device.

It should be realized, at this point, that the halos or configurations of light just described and the construction provided to effect the same in no wise affects the operation of the reflector 50 in the form of device illustrated in Fig. 9, which both in theory and practice operates exactly as does such reflector in the construction hereinbefore described in Fig. 1.

Turning next to Fig. 10, it will be observed we there show a fifth possible variant and modified embodiment adapted to use in cases where it is desired that the entire illuminating device be disposed below the ceiling, and encased to a desired extent within a suitable housing. Thus, in this figure we show a sloping ceiling 88, against and to which a plate of suitable configuration 89 has been mounted. Secured to plate 89, by flanges 90a, is a bracket 90 having a lower horizontal wall or arm 90b, which provides the same functions as does the lower surface of outlet box 20 of the form of our device illustrated in Fig. 1, and to which socket 19, mounted below adjusting shims 19a, and carrying lamp 25, is secured in suitable fashion. Plate 89, at its remote edges, is provided with flanged-over rim 91 which holds to plate 89 an outermost housing 92 of suitable and adequate decorative configuration. Internally of housing 92 is a plate 93 having a circular hole therein of suitable dimensions, which plate, by means of its flanged-over rim 93b, is suitably secured to the internal surface of housing 92, at a suitable distance down from the socket 19. The circular opening in this plate is of such diameter that the reflector 50 may be passed therethrough, and such reflector surface 50 may at its flange 50a be suitably secured to the undersurface of the plate 93.

It will be readily understood that the construction which we have just described may be suitably varied in numerous ways to meet various desired conditions. Thus, for example, instead of a separate plate 93 being employed, flanged to the housing 92 by means of flanged-over rim 93b, such plate may be made integral with the internal wall of housing 92, and likewise, instead of the plate 89 providing a mount for the socket 19 by means of the bracket 90, such socket might be in some other fashion appropriately carried by the plate 89; and hence, the construction as heretofore outlined by us should be considered as illustrative, and in no sense as limiting.

Continuing forward, it will be found that the housing 92 is provided at its lower end with a flanged-over rim 92a which provides a circular orifice. The upper surface of the rim 92a acts as one baffle plate and as the support for a series of further baffle plates 93, 94, 95, 96 and 97, each having an orifice. It will be understood that such orifices are graduated in size in accordance with principles hereinbefore outlined in connection with the orifices in the baffle plates in the form of our device described in Fig. 1. It will likewise be realized that the rim 92a in this embodiment performs the functions heretofore provided by the ceiling plate 79 in Fig. 9, and that the baffle plates 93 and 94 lie beneath the rim 92a in a fashion similar to that in which the baffle plates 77 and 78 lie beneath the ceiling plate 79 in Fig. 9.

The whole series of these baffle plates just described may be supported and properly spaced apart and positioned with respect to each other and with respect to reflector 50 by any suitable means, such, for example, as by pins 98 having flanged-over ends 99 and 100, with the baffle plates being held, space-apart one with respect to the other, by means of separating sleeves 101 interposed between successive baffle plates. The principles governing these pins and sleeves and the materials of which they may be fabricated are the same as those heretofore discussed in connection with the pins 83 and the sleeves 86 and 87 in Fig. 9. It also now will be understood that, both in theory and practice, this form of our device will effectively function like the form of our device which we have hereinbefore described and shown in Fig. 9; that is, with the effects due to the reflector 50, having superadded thereto the halos or configurations of light due to such baffle plates as are external to the rim 92a.

An important fact that should be noted is that in both Fig. 9 and Fig. 10, the lower focal point of the ellipsoidal surface 14 of reflector 50 falls in the center of the aperture of the lowermost baffle plate, irrespective of the position of the ceiling. But, it will be understood that this does not alter the function of the reflector 50 in our devices, nor the halos or light configurations created about those baffle plates which are disposed below the undersurface of the ceiling.

It, of course, will be appreciated that instead of arranging the lower end of housing 92 so that two baffle plates are disposed below the rim 92a, that some other desired arrangement might be effected; thus, one or more of, or even all or none of the baffle plates might be arranged below housing 92, or even vertical louvres, like the louvres 58 and 63, shown in Figs. 6 and 7, might be embodied in this construction. Further, referring to Fig. 11, it will be observed that we have shown the external construction of housing 92 as being substantially octagonal in shape. However, it will be realized that all of this may be varied, as desired, and hence all of the same has been shown and discussed as purely illustrative and not in any sense as limiting.

It will also be appreciated that, although in this embodiment the entire device is mounted below the ceiling, the same, nevertheless, is suitably enclosed so that no dust or dirt may settle onto our reflector; and, those parts of our unit which ordinarily might not be considered ornamental are enclosed away from view.

Turning next to Fig. 12, it will be noted that we here show a possible modified form of reflector 102, which alternatively may be used in our illuminating devices, instead of the reflector 50, illustrated in the preceding views. This reflector 102 likewise has an ellipsoidal surface 14, a spherical surface 16, and a paraboloidal surface 17. The essential difference between reflector 102 and reflector 50 is that in reflector 102 the intermediate joining surface 14a is omitted, and the reflector, instead of being made in one piece, having each surface integrally joined to the next, is made in two parts; one part consisting of the paraboloidal and spherical surfaces 16 and 17 integrally joined, and the other part consisting of the ellipsoidal surface 14, with the first part being secured to the second by a suitable flange 16a, which flange is joined to reflector surface 16 by a wall 16b. All of this, however, is to be understood as being so effected in reflector 102, that the ellipsoidal surface 14 thereof, the spherical surface 16 thereof, and the paraboloidal surface 17 thereof function as do the corresponding surfaces in reflector 50, without the manner of fabricating the reflector in any way changing the same.

From the foregoing, it will be realized that the sole effect of fabricating our reflector 102 instead of 50 is to eliminate the surface 14a in favor of the surfaces 16a and 16b. However, since the surface 14a played no part in downward reflection, the effect of this substitution is immaterial insofar as consequential results effected in the beam patterns go; and by means of this alternative construction, fabrication of a suitable reflector may be found to be effected in a more desirable fashion, either from the viewpoint of simplicity or expense in the fabrication thereof.

Turning next to Fig. 13, it will be observed that we here show how all of our reflecting surfaces, if desired, may be provided with a sheath of transparent radiant heat energy-absorbing glass or other suitable material, contiguous to such reflecting surfaces so that such radiant heat energy as would be normally emitted by the source of illumination may, to the maximum extent possible, be absorbed and not reflected downwardly by the reflector surface upon which the light rays fall. Thus, in this figure we have illustrated a typical reflector 50, contiguous to the internal reflecting surfaces of which is disposed a suitable sheath 103 of a material having the inherent property of readily absorbing radiant heat energy, and which is highly transparent, and therefore does not intercept to any marked degree the light, nor effect any diffusing action at, or adjacent to, the reflecting surfaces of reflector 50.

We propose that such a sheath of a material, having the inherent property of readily absorbing radiant heat energy, be disposed contiguous to the reflecting surfaces of our reflectors whenever it is desired to absorb and dispose of such radiant heat energy as is emitted from the source of illumination to the maximum degree possible, without appreciably impairing the lighting efficiency or functions of our illuminating devices. It will be understood that such material may be disposed contiguous to any or all reflecting surfaces of any or all of our reflectors 50 or 102, as found desirable.

It will, of course, be understood that adequate means must be provided for disposing of such radiant heat energy as is absorbed at the surfaces of reflector 50 or 102, and thus, should the vent orifices 23b prove inadequate for such purpose, other expedients must be employed, such, for example, as by increasing the orifices 23b either in number, size, or both and, if necessary, by providing some form of draft to be forced through the interior of our devices.

We have found that the employment of devices constructed in accordance with the principles of the invention herein disclosed by us, when properly adjusted, applied, and used, provides the lighting effects and conditions hereinbefore mentioned as desirable.

It will be obvious from the foregoing that the invention we have herein disclosed incorporates many features which are possible to general adaptation in lighting devices generally. Furthermore, it is conceivable that materials other than those which we have mentioned as preferable might be employed in place of those we have mentioned, with equal result. Still further, we are, of course, aware that many changes in the details of construction and relative arrangements of parts will readily suggest themselves to those skilled in the art. Accordingly, we do not, therefore, desire to be limited to the exact details herein set forth by way of illustration, but rather to the spirit and scope of our invention as we define it in the appended claims.

What we seek to secure by and claim for United States Letters Patent is:

1. A reflector adapted to cast from a standard lamp a beam, any section of which, taken perpendicular to the axis of the reflector, is of substantially uniform intensity, said reflector including a lower substantially ellipsoidal zone-like reflecting surface, an intermediate substantially spherical zone-like reflecting surface and an upper substantially paraboloidal zone-like reflecting surface, said surfaces being so arranged that the upper one of the focal points of the substantially ellipsoidal reflecting surface, the center of the substantially spherical reflecting surface and the focus of the substantially paraboloidal reflecting surface, all coincide at a single common point, which falls substantially at the theoretical light center of the lamp; said ellipsoidal reflecting surface being arranged to extend above such common point an angular distance substantially half the angular distance that it extends therebelow, and said spherical reflecting surface being arranged to extend above said ellipsoidal reflecting surface an angular distance substantially to the angular distance that the ellipsoidal reflecting surface extends above the aforementioned common point and said spherical surface being so positioned as to redirect such light as falls thereon to substantially the lowermost angular third of the ellipsoidal reflecting surface, to strengthen such beam component as is reflected thereby.

2. A reflector having a plurality of co-acting reflecting surfaces, the uppermost one of said surfaces being a zone of a paraboloid of revolution and the lowermost one of said surfaces being a zone of an ellipsoid of revolution, the major axis of which is collinear with the axis of the aforesaid paraboloid of revolution, said surfaces being such that the diameter of the lowermost base of the uppermost surface is substantially equal to the diameter of the uppermost base of the lowermost surface, and said lowermost surface being such as would be subtended from the said ellipsoid of revolution between an upper plane, which is perpendicular to the common axis at a point thereon above the upper focus of the ellipsoid of revolution, and a lower plane which is substantially perpendicular to such axis, at such distance below the first mentioned plane that the angle, which is definitive of the extension of such lowermost surface upwardly from such focus, is substantially half the angle which is definitive of the extension of such surface downwardly from such focus.

3. The structure recited in claim 2 characterized in that the second mentioned plane, definitive of the ellipsoidal reflecting zone, is substantially perpendicular to the common axis of the zones, substantially at the minor axis of the ellipse, whose revolution is generative of the ellipsoid of revolution; and further characterized in that the conjugate focus of such ellipse is substantially coincident with the center of an aperture through which the reflector casts light.

4. A reflector having a plurality of co-acting reflecting surfaces, the uppermost one of said surfaces being a zone of a paraboloid of revolution, the intermediate one of said surfaces being a zone of a sphere and the lowermost one of said surfaces being a zone of an ellipsoid of revolution, the center axis of the reflector being collinear with the axis of the paraboloidal zone, one of the radii of the spherical zone and the major axis of the ellipsoidal zone, the ellipsoidal zone being such as would be subtended from the aforesaid ellipsoid of revolution between an upper plane, which is perpendicular to the common axis at a point thereon above the upper focus of the ellipsoid of revolution, and a lower plane, which is substantially perpendicular to such axis, at such distance below the first mentioned plane, that the angle which is definitive of the extension of the ellipsoidal surface downwardly from the aforementioned upper focus is substantially equal to the angle which is definitive of the extension of such surface and the surface which is a zone of a sphere upwardly from such focus.

5. In a combination of the type described, an apertured wall, a housing supported by and hidden behind said apertured wall, a reflector supported within said housing in spaced-apart relation to said aperture; said reflector having a zone-like upper paraboloidal reflecting surface, a zone-like intermediate spherical reflecting surface and a zone-like lower ellipsoidal reflecting surface, all with the axis of the paraboloidal reflecting surface, one of the radii of the spherical reflecting surface and the major axis of the ellipsoidal reflecting surface being collinear with the center axis of the said reflector, and with the focus of the paraboloidal reflecting surface, the center of the spherical reflecting surface and one of the foci of the ellipsoidal reflecting surface being coincident at a single common point on the said common axis, while the conjugate focal point of the ellipsoidal reflecting surface falls substantially at the center of the aperture in said wall and on the said common axis; said reflector being further characterized in that the greatest diameter of the paraboloidal reflecting surface, the smallest diameter of the spherical reflecting surface and the smallest diameter of the ellipsoidal reflecting surface are substantially equal, while the upper edge of the ellipsoidal reflecting surface extends above the aforementioned common focal point, a standard lamp, means carried by said housing for supporting and energizing said lamp, and means for adjusting the position of said lamp so that the theoretical light center thereof falls substantially at the aforementioned common focal point.

6. In a combination of the type described for providing light of substantially uniform intensity on a given area, a source of light, a wall having an aperture therein, which wall is interposed between the source of light and the area to be illuminated, said source of light being so arranged that certain light rays emitted by the source may pass through the aforementioned aperture to the area to be illuminated, a reflector for reflecting other light rays emitted by said source also through said aperture to said area, said reflector including an upper substantially paraboloidal zone-like reflecting surface, an intermediate substantially spherical zone-like reflecting surface and a lower substantially ellipsoidal zone-like reflecting surface, said surfaces being arranged so that they have a common axis which forms the center axis of the reflector, and so that the focus of the substantially paraboloidal reflecting surface, the center of the substantially spherical reflecting surface and the upper focal point of the substantially ellipsoidal reflecting surface, all coincide at a single common point, while the conjugate focal point of the substantially ellipsoidal reflecting surface falls substantially at the geometrical center of the aperture; the aforesaid substantially ellipsoidal reflecting surface being characterized in that it is that zone of the ellipsoid of revolution of which it is a part, which lies between an upper plane, substantially perpendicular to the axis of the reflector at a point thereon above the upper focal point of said ellipsoid of revolution and a lower plane, substantially at the minor axis of such ellipsoid of revolution; and said substantially spherical reflecting surface being characterized in that it is so positioned that it reflects such light rays as fall thereupon towards the lower regions of the substantially ellipsoidal reflecting surface, means for supporting the aforesaid reflector at proper distance from the aforementioned aperture and means for supporting said source of light so that the theoretical light center thereof falls substantially at the aforementioned single common point.

7. The structure recited in claim 6 characterized in that a multiplicity of parallel spaced-apart baffle plates are suitably supported between the bottom of the substantially ellipsoidal reflecting surface and the apertured wall, each of said baffle plates having a hole extending therethrough, with the hole diameters progressively decreasing from that in the baffle plate nearest to the bottom of the substantially ellipsoidal reflecting surface to that furthest therefrom, as progressive departure is made downwardly from the uppermost baffle plate, and with the progressive decrease in diameter varying in direct proportion to the axial spacing of the plates away from the bottom of the substantially ellipsoidal reflecting surface.

8. The structure recited in claim 6 characterized in that an additional reflecting surface is interposed between the bottom of the substantially ellipsoidal reflecting surface and the apertured wall, said additional reflecting surface being characterized in that it is a segment of a zone of what is substantially in ellipsoid of revolution whose focal points are coincident with the focal points of the substantially ellipsoidal reflecting surface herein before first mentioned.

9. The structure recited in claim 6 characterized in that an additional reflecting surface is interposed between the bottom of the substantially ellipsoidal reflecting surface and the apertured wall, said additional reflecting surface being characterized in that it is a segment of a zone of what is substantially an ellipsoid of revolution whose focal points are coincident with the focal points of the substantially ellipsoidal reflecting surface herein before first mentioned; and being further characterized in that a multiplicity of parallel spaced-apart baffle plates are suitably supported between the bottom of said first mentioned substantially ellipsoidal reflecting surface and the apertured wall and about the additional reflecting surface in such fashion as to lie clear of such light rays as fall thereupon and are reflected therefrom, each of said baffle plates having a hole extending therethrough, with the hole diameters progressively decreasing from that in the baffle plate nearest to the bottom of the first mentioned substantially ellipsoidal reflecting surface to that furthest therefrom, as progressive departure is made downwardly from the uppermost baffle plate, and with the progressive decrease in diameter varying in direct proportion to the axial spacing of the plates away from the bottom of the first mentioned substantially ellipsoidal reflecting surface.

10. A light projector comprising a light source and a reflector adapted to reflect in a beam such light as falls thereon from the light source, said reflector including a lower zone-like substantially ellipsoidal reflecting surface and a zone-like substantially spherical reflecting surface mounted thereabove, said surfaces being characterized in that the upper focal point of that ellipsoid, of which the substantially ellipsoidal reflecting surface is a part, and the center of that sphere, of which the substantially spherical reflecting surface is a part, coincide substantially at a single common point, positioned substantially at the theoretical center of the aforementioned light source, and, being further characterized in that the ellipsoidal reflecting surface extends above such common point an angular distance substantially half the angular distance that it extends therebelow, and the spherical reflecting surface extends above said ellipsoidal reflecting surface an angular distance substantially equal to the angular distance that the ellipsoidal reflecting surface extends above the aforementioned common point; and said spherical reflecting surface being so positioned as to redirect such light as falls thereon to substantially the lowermost third of the ellipsoidal reflecting surface to strengthen such beam component as is reflected thereby.

11. The structure recited in claim 2 characterized in that the mentioned reflector has an additional surface which is a zone of a sphere, the axis of which zone is collinear with the common axis of the ellipsoidal and paraboloidal reflecting surfaces, said zone being such that the radii which subtend it are at an angle substantially equal to the angle which is definitive of the extension of the ellipsoidal reflecting surface upwardly of the upper focus thereof.

12. In a light projector, a light source and a reflector, having a lower reflecting surface, which is a zone of substantially an ellipsoid of revolution, an intermediate reflecting surface, which is a zone of substantially a sphere, and an upper reflecting surface, which is a zone of substantially a paraboloid of revolution, said surfaces being arranged with the upper focus of the ellipsoid of revolution, the center of the sphere and the focus of the paraboloid of revolution falling coincident at a single common point, substantially at the theoretical light center of the source, and with the major axis of the ellipsoid of revolution, one of the radii of the sphere and the axis of the paraboloid of revolution being collinear with the center axis of the reflector; and with said reflecting surfaces being characterized in that the reflecting surface which is a zone of an ellipsoid of revolution angularly extends relative to the aforementioned upper focus, below and above such focus, with the angular extension below, exceeding the angular extension above, and, in that the aforementioned reflecting surface, which is a zone of a sphere, extends, relative to its center, through an angle which is substantially equal to the amount by which the extension of the ellipsoidal reflecting surface downwardly from such focus exceeds the extension thereof upwardly from such focus.

13. The structure recited in claim 12 characterized in that the diameter of the lower edge of the paraboloidal reflecting surface is substantially equal to the diameter of the upper edge of the ellipsoidal reflecting surface, while the radius of the spherical reflecting surface is greater than the distance from the mentioned upper focus of the ellipsoidal reflecting surface to any point on the upper edge thereof.

14. The structure recited in claim 6 characterized in that the planes definitive of the mentioned ellipsoidal reflecting surface are such that said reflecting surface angularly extends half as much up from a plane perpendicular to the common axis at the upper focal point thereon, as it does therebelow; and, that the means for supporting the mentioned reflector at proper distance from the mentioned aperture includes a housing and means on the internal surface of said housing for eliminating all specular reflection therefrom.

15. In a device of the type described a tubular housing, a light projector as recited in claim 12 mounted with the reflector thereof over the open upper end of said housing, and a body of translucent diffusing material having a substantially central portion thereof through which light may unobstructedly pass, said body being so positioned that it substantially closes off the lower open end of said housing and the conjugate focal point of the ellipsoidal reflecting surface falls substantially at the center of the mentioned central portion thereof.

16. In a device of the type described a tubular housing, a reflector mounted over the upper open end of said housing, said reflector having a lower zone-like substantially ellipsoidal reflecting surface, an intermediate zone-like substantially spherical reflecting surface and an upper zone-like substantially paraboloidal reflecting surface, with each of said surfaces generally facing downwardly and together with the housing having a common axis, and a common point on such axis which constitutes one of the focal points of the ellipsoidal reflecting surface, the center of the spherical reflecting surface and the focus of the paraboloidal reflecting surface, a lamp disposed so that its theoretical light center falls at said point, and a body of translucent diffusing material, through a substantially central portion of which light may unobstructedly pass without diffusion, said body being so positioned that it substantially closes off the lower open end of said housing and the conjugate focal point of the ellipsoidal surface falls substantially at the center of the aforementioned central portion thereof; all with the internal surface of the aforementioned housing having a light diffusing surface, the apparent brightness of which, when viewed through the aforementioned substantially central portion of the said body which substantially closes off the lower open end of such housing, is substantially the same as the apparent brightness of the exterior of said body.

17. The structure recited in claim 12 characterized in that an additional reflecting surface is mounted below that reflecting surface which has the form of a zone of an ellipsoid, which additional reflecting surface has the form of a segment of a zone of an ellipsoid of revolution whose upper and lower focal points are common with the upper and lower focal points of that ellipsoid of revolution of which the first mentioned ellipsoidal reflecting surface is a zone, said additional reflecting surface being characterized in that its lower edge lies substantially in such plane as is perpendicular to the common axis of the reflector at the lower and conjugate focal point of the mentioned ellipsoids of revolution.

18. A reflector including a reflecting surface which is a zone of an ellipsoid of revolution, which zone extends above and below one of the foci of said ellipsoid and a reflecting surface which is a zone of a sphere, whose center is coincident with such focus, said last mentioned zone being characterized in that the radii which subtend it are at an angle equal to the amount by which the downward angular extension of the ellipsoidal reflecting surface below such focus exceeds the upward angular extension thereof above such focus, and a supplemental reflecting surface having the form of a segment of a zone of an ellipsoid, whose respective foci coincide with the respective foci of the mentioned ellipsoidal reflecting zone, which extends from the lower edge of said zone substantially to the plane perpendicular to the major axis of the ellipsoid at its conjugate focal point.

19. In an illuminating combination a ceiling having an aperture therein, a side wall and means above said aperture for illuminating a substantially rectangular area on said side wall, said means including a source of light mounted above the aperture and a reflector spaced apart from said source of light and disposed so that the lower edge of such reflector falls adjacent the plane of said aperture; said reflector having such reflecting surface as is generated by rotating a part of an ellipse, the foci of which are at the theoretical center of the source of light and the center of the aperture, respectively, about the imaginary line joining such points through an angle predeterminedly limited to accord with the width of the rectangular side wall area to be illuminated by such reflector.

20. The structure recited in claim 19 characterized in that the reflecting surface of the mentioned reflector is that segment of a zone of an ellipsoid, the upper edge of which lies in an upper plane perpendicular to the mentioned imaginary line adjacent the minor axis of the mentioned ellipse, the lower edge of which lies in a lower plane parallel to the last mentioned plane and perpendicular to the mentioned imaginary line adjacent the plane of the mentioned aperture, and the respective side edges of which are defined by the prolongation past the center of the aperture of two side planes, defined by the right side edge of the side wall area to be illuminated and the center of the aperture, and the left side edge of the side wall area to be illuminated and the center of the aperture, respectively, until such side planes intersect the zone of the ellipsoid of which said segment is a part.

21. The structure recited in claim 1 characterized in that an additional reflecting surface extends from the lower edge of the substantially ellipsoidal reflecting surface, said additional reflecting surface being characterized in that it is a segment of a zone of what is substantially an ellipsoid of revolution, whose focal points are coincident with the focal points of the substantially ellipsoidal reflecting surface hereinbefore first mentioned.

22. In a device of the type described a wall having an aperture therein, a standard lamp, a reflector spaced apart from said wall and behind the aperture therein for reflecting light emitted by said lamp through said aperture, said reflector including a reflecting surface which is a zone of an ellipsoid of revolution, which zone extends above and below one of the foci of said ellipsoid, a second reflecting surface which is a zone of a sphere whose center is coincident with such focus, said last mentioned zone being characterized in that the radii which subtend it are at an angle equal to the amount by which the downward angular extension of the ellipsoidal reflecting surface below such focus exceeds the upward angular extension thereof above such focus, and a third reflecting surface which is a zone of a paraboloid of revolution, the focus of which also coincides with the aforementioned focus of the ellipsoidal reflecting surface, with all of said reflecting surfaces being arranged to generally face the aperture, said upper paraboloidal reflecting surface being characterized in that it has a hole in its top through which the aforementioned lamp is adapted to extend, an enclosing casing adapted to enclose said reflector, means for adjusting the position of the aforementioned lamp so that the theoretical light center thereof falls substantially at the aforementioned common focal point and means for tilting the said reflector, lamp and casing to a prechosen angular position with respect to said apertured wall and fixedly setting it in tilted position.

23. A light projector comprising a light source and a reflector adapted to project forwardly thereof in a beam such light as falls thereon from said source, said reflector including a reflecting surface which is substantially a zone of an ellipsoid of revolution and a reflecting surface which is substantially a zone of a sphere, said reflecting surfaces having a common axis, at a single point on which falls the upper focus of the aforementioned ellipsoid of revolution, the center of the aforementioned sphere and the theoretical center of the aforementioned light source; said ellipsoidal reflecting surface being characterized in that it extends downwardly and upwardly relative to an imaginary plane perpendicular to the aforementioned common axis at the aforementioned common point thereon, with the angular downward extension thereof exceeding the angular upward extension thereof by an amount equal to the angular extension of the spherical reflecting surface; and the reflecting surface which is a zone of a sphere being so arranged that the light rays redirected from its upper edge, through the theoretical center of the aforementioned source, impinge upon the ellipsoidal reflecting surface substantially at its lower edge, while the light rays redirected from its lower edge through the theoretical center of the aforementioned source, impinge upon the ellipsoidal reflecting surface in an imaginary circle thereon which is at an angular extension downwardly of the aforementioned plane equal to the angular extension of the ellipsoidal reflecting surface upwardly of such plane; whereby the beam projected is strengthened in its outer regions.

EDWARD RAMBUSCH.
VICTOR G. ANDERSON.

CERTIFICATE OF CORRECTION.

Patent No. 2,179,161. November 7, 1939.

EDWARD RAMBUSCH, ET AL.

It is hereby certified that error appears in the printed specification of the above numbered patent requiring correction as follows: Page 1, first column, line 7, after the word and comma "devices," insert a quotation mark; page 2, second column, line 20, for "back" read both; line 42, for "of ordinary" read for ordinary; page 4, first column, line 40, for "concide" read coincide; and second column, line 20, for "Fig. 8" read Fig. 6; page 6, first column, line 20, for "corresponding" read correspondingly; line 25, for "therefore" read therefor; page 7, first column, line 49, strike out "density" second occurrence; page 12, first column, line 11, for "arm" read arms; page 16, first column, line 5, claim 1, after "substantially" insert equal; page 17, first column, line 18, claim 8, for "in" read an; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.